US012600200B2

(12) United States Patent     (10) Patent No.: US 12,600,200 B2

Michikawauchi et al.     (45) Date of Patent: Apr. 14, 2026

(54) IN-VEHICLE TEMPERATURE CONTROL SYSTEM

(71) Applicants: TOYOTA JIDOSHA KABUSHIKI KAISHA, Toyota (JP); DENSO CORPORATION, Kariya-city (JP)

(72) Inventors: Ryo Michikawauchi, Numazu (JP); Hidefumi Aikawa, Sunto-gun (JP); Masanari Numata, Kariya (JP); Yu Ofune, Kariya (JP); Satoshi Ito, Kariya (JP); Naoki Kato, Kariya (JP); Tatsuhito Matsumoto, Kariya (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 207 days.

(21) Appl. No.: 18/413,746

(22) Filed: Jan. 16, 2024

(65) Prior Publication Data

US 2024/0239158 A1     Jul. 18, 2024

(30) Foreign Application Priority Data

Jan. 16, 2023    (JP) ................................. 2023-004520

(51) Int. Cl.
    *B60H 1/00*        (2006.01)
    *B60H 1/32*        (2006.01)

(52) U.S. Cl.
    CPC ..... *B60H 1/32284* (2019.05); *B60H 1/00278* (2013.01); *B60H 2001/00307* (2013.01); *B60H 1/323* (2013.01); *B60H 2001/3255* (2013.01); *B60H 2001/3285* (2013.01)

(58) Field of Classification Search
    CPC ....................... B60H 1/32284; B60H 1/00278; B60H 1/323; B60H 2001/00307; B60H 2001/3255; B60H 2001/3285
    USPC ........................................................ 165/202
    See application file for complete search history.

(56) References Cited

U.S. PATENT DOCUMENTS

2019/0375270 A1* 12/2019 Boger ................ B60H 1/00392
2022/0009309 A1   1/2022 Miura et al.

FOREIGN PATENT DOCUMENTS

JP        2020-165604 A     10/2020

* cited by examiner

*Primary Examiner* — Davis D Hwu

(74) *Attorney, Agent, or Firm* — Oblon, McClelland, Maier & Neustadt, L.L.P.

(57) ABSTRACT

A system includes a refrigeration circuit, low-temperature circuit and controller. The refrigeration circuit includes: a tiller for absorbing heat from a colling water to a refrigerant; and a condenser for releasing heat from the refrigerant to an outside, and realizes a refrigeration cycle by circulating the refrigerant therethrough. The low-temperature circuit includes the tiller and an external heat exchanger for absorbing heat from an outside to the first heat medium, and circulate the cooling water therethrough. The controller can change a heat absorption amount of the refrigerant at the tiller. The controller controls the device so that a change in the heat absorption amount of the refrigerant at the first heat exchanger in accordance with a change in a temperature of the first heat medium is reduced, if the temperature of the cooling water flowing through the first heat exchanger changes by a reference value or more.

13 Claims, 18 Drawing Sheets

IN-VEHICLE TEMPERATURE CONTROL SYSTEM

FIELD

The present disclosure relates to an in-vehicle temperature control system.

BACKGROUND

Conventionally, there has been known an in-vehicle temperature control system that includes a low-temperature-side thermal circuit in which a low-temperature-side heat medium circulates, a refrigeration circuit in which a refrigerant circulates, and a high-temperature-side thermal circuit in which a high-temperature-side heat medium circulates (JP 2020-165604 A). In the in-vehicle temperature control system described in JP 2020-165604 A, heat absorption from the heat medium to the refrigerant is performed by a chiller, and heat used for heating an interior of the vehicle is dissipated from the refrigerant in a condenser.

In particular, it is disclosed in JP 2020-165604 A that the flow rate of the refrigerant through the chiller is temporarily reduced to prevent deterioration of the durability of the compressor, when a state is changed from a state where the cooling of the battery provided in the low-temperature-side thermal circuit is demanded to a state where it is not demanded, or when a stated is changed from the state where it is not demanded to the state where it is demanded. In addition, in JP 2020-165604 A, the high-temperature-side heating medium is heated by an electric heater since the temperature of the air blown into the interior of the vehicle is reduced in the heating mode by decreasing the flow rate of the refrigerant passing through the chiller.

SUMMARY

In the control described in JP 2020-165604 A, the high-temperature-side heating medium is heated by the electric heater in order to suppress a decrease in the temperature of the blown air in the heating mode. Therefore, when the electric heater is not provided, there is a possibility that the temperature of the blown air in the heating mode is decreased.

In view of the above problems, an object of the present disclosure is to suppress a change in the temperature of the air blowen into the interior of the vehicle even if the temperature of the low-temperature-side heat medium in the low-temperature-side thermal circuit changes.

The gist of the present disclosure is as follows.

(1) An in-vehicle temperature control system which is provided with a vehicle, comprising:

a refrigeration circuit having: a first heat exchanger for absorbing heat from a first heat medium to a refrigerant to evaporate the refrigerant; and a second heat exchanger for releasing heat from the refrigerant to an outside to condense the refrigerant and being able to use the released heat for heating an interior of the vehicle, wherein the refrigeration circuit is configured to realize a refrigeration cycle by circulating the refrigerant through them;

a first thermal circuit having: the first heat exchanger; and an external heat exchanger for absorbing heat from an outside to the first heat medium, wherein the first thermal circuit is configured to circulate the first heat medium through them; and

a controller capable of changing a heat absorption amount of the refrigerant at the first heat exchanger and for controlling a device associated with the refrigeration circuit or the first thermal circuit, wherein the controller controls the device in a direction where a change in the heat absorption amount of the refrigerant at the first heat exchanger in accordance with a change in a temperature of the first heat medium is reduced, if the temperature of the first heat medium flowing through the first heat exchanger changes by a reference value or more, or if the temperature of the first heat medium flowing through the first heat exchanger is predicted to change by a reference value or more, during heating of the interior of the vehicle.

(2) The in-vehicle temperature control system according to above (1), further comprising a temperature detector for detecting the temperature of the first heat medium flowing through the first heat exchanger, wherein the controller controls the device in a direction where a change in the heat absorption amount of the refrigerant at the first heat exchanger in accordance with a change in a temperature of the first heat medium is reduced, if a temperature detected by the temperature detector during heating of the interior of the vehicle changes by a reference value or more per unit time.

(3) The in-vehicle temperature control system according to above (1) or (2), wherein the first thermal circuit has a plurality of parallel flow paths through which the first heat medium flows, the in-vehicle temperature control system further comprises: a first temperature detector for detecting the temperature of the first heat medium flowing through the first heat exchanger; and a second temperature detector for detecting the temperature of the first heat medium in a flow path through which the first heat medium does not flow before switching the flow path and flows after switching the flow path, among the first thermal circuit, and the controller predicts whether the temperature of the first heat medium flowing through the first heat exchanger changes by a reference value or more by switching the flow path, based on the temperature detected by the first temperature detector and the temperature detected by the second temperature detector.

(4) The in-vehicle temperature control system according to any one of above (1)-(3), wherein the controller controls the device in a direction where a change in the heat absorption amount of the refrigerant at the first heat exchanger in accordance with a change in the temperature of the first heat medium decreases, in the case where it is predicted that the temperature of the first heat medium flowing through the first heat exchanger changes by a reference value or more during heating in the interior of the vehicle, when the temperature of the first heat medium flowing through the first heat exchanger changes by a second reference value, which is smaller than the reference value, or more, after the prediction.

(5) The in-vehicle temperature control system according to any one of above (1)-(4), further comprising a second thermal circuit having the second heat exchanger and a heater core used for heating the interior of the vehicle and configured to circulate a second heat medium therethrough, wherein the second heat exchanger dissipates heat from the refrigerant to the second heat medium.

(6) The in-vehicle temperature control system according to above (5), wherein the controller starts to control the device in the case where the temperature of the first heat medium flowing into the first heat exchanger changes by a reference value or more or it is predicted that the temperature of the first heat exchanger flowing into the first heat exchanger changes by a reference value or more, before the temperature of the second heat medium flowing into the heater core changes in accordance with the change in the temperature of the first heat medium, during heating of the interior of the vehicle.

(7) The in-vehicle temperature control system according to above (5) or (6), wherein the second heat exchanger is not provided with an electric heater that heats the second heat medium flowing into the heater core.

(8) The in-vehicle temperature control system according to any one of above (1)-(7), wherein the device is a device capable of changing a value of a parameter including at least one of a flow rate of the refrigerant in the refrigeration circuit, a flow rate of the first heat medium in the first thermal circuit, a degree of superheat of the refrigerant flowing into the first heat exchanger, and a heat absorption amount in the external heat exchanger.

(9) The in-vehicle temperature control system according to above (8), wherein the device includes a compressor provided in the refrigeration circuit and compressing the refrigerant, and the controller controls a discharge flow rate of the compressor to control a flow rate of refrigerant in the refrigeration circuit.

(10) The in-vehicle temperature control system according to above (8) or (9), wherein the device includes a pump provided in the first thermal circuit and pumping the first heat medium, and the controller controls the discharge flow rate of the pump to control the flow rate of the first heat medium in the first thermal circuit.

(11) The in-vehicle temperature control system according to any one of above (8)-(10), wherein the device includes an expansion valve provided in the refrigeration circuit and reducing the pressure of the refrigerant, and the controller controls an opening degree of the expansion valve to control a degree of superheat of the refrigerant flowing into the first heat exchanger.

(12) The in-vehicle temperature control system according to above (8), wherein the external heat exchanger is configured to exchange heat between an external heat source and the first heat medium of the first thermal circuit via a third heat medium, and the controller controls a flow rate of the third heat medium in the external heat exchanger to control the heat absorption amount at the external heat exchanger.

(13) The in-vehicle temperature control system according to above (12), wherein the external heat source is an electric motor that drives the vehicle.

BRIEF DESCRIPTION OF DRAWINGS

FIG. 13 is a diagram schematically illustrating a flow mode of the heat medium in the second heating mode according to a modification.

FIG. 15 is a time chart, similar to FIG. 10, of the connection state of a five-way valve, etc.

FIG. 18 is a flowchart of processing for controlling the compressor and the second expansion valve during heating.

DESCRIPTION OF EMBODIMENTS

Figure 1:
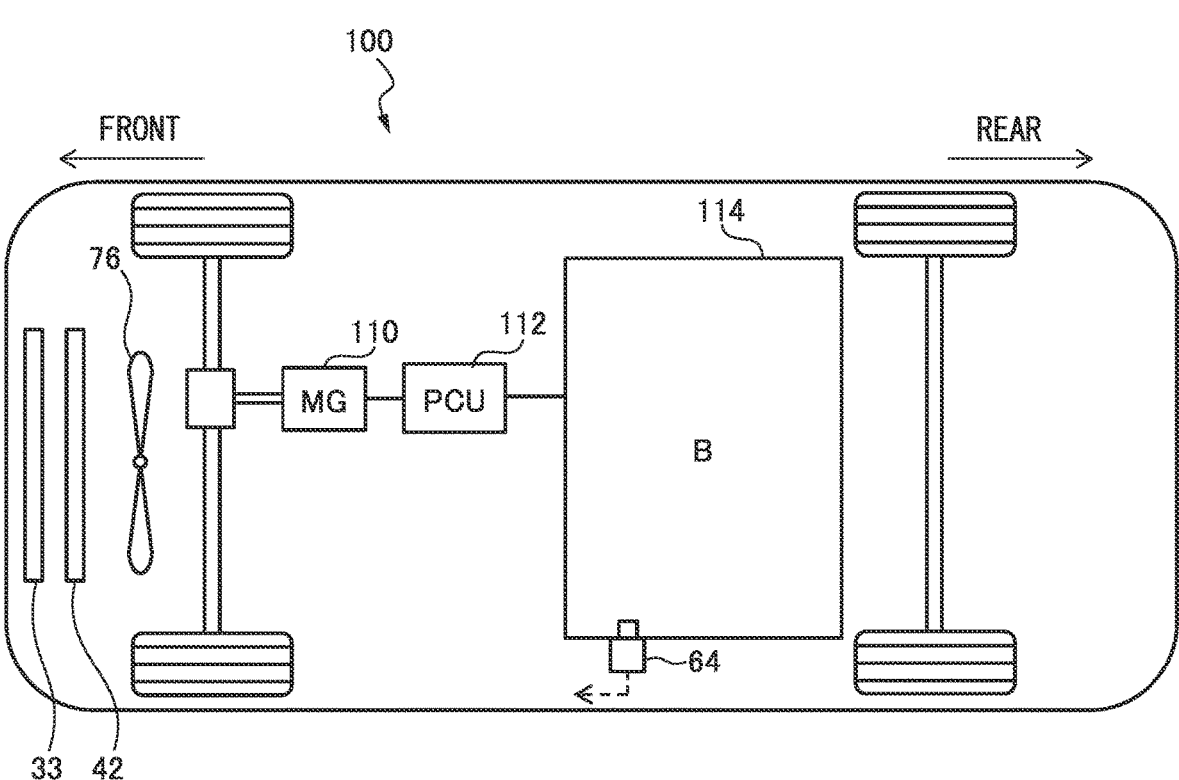
FIG. 1 is a diagram schematically illustrating a configuration of a vehicle equipped with an in-vehicle temperature control system according to one embodiment.

Hereinafter, embodiments will be described in detail with reference to the drawings. In the following description, the same reference numerals are given to the same elements.

FIRST EMBODIMENT

<Configuration of Vehicle>

FIG. 1 is a diagram schematically illustrating a configuration of a vehicle 100 equipped with an in-vehicle temperature control system 1 according to a first embodiment. In FIG. 1, the left side indicates a front side of the vehicle 100, and the right side indicates a rear side of the vehicle 100. As shown in FIG. 1, the vehicle 100 is an electric vehicle (BEV), and includes a motor generator (MG) 110 for driving the vehicle, and a power control unit (PCU) 112 electrically connected to the MG 110, and a battery 114 electrically connected to the PCU 112.

The MG 110 functions as an electric motor and a generator. The MG 110 is used to drive the vehicle 100 or to regenerate when braking the vehicle 100. In the present embodiment, the MG 110 that functions also as a generator is used as a motor for driving the vehicles 100, but a motor that does not function as a generator but functions only as an electric motor may be used.

The PCU 112 is connected between the battery 114 and the MG 110 to control the power supplied to the MG 110. The PCU 112 includes heat generating components such as an inverter that drives a motor, a step-up converter that controls a voltage, and a DC/DC converter that steps down a high voltage. The battery 114 is connected to the PCU 112 and supplies power for driving the vehicles 100 to the MG 110.

The vehicle 100 may be a hybrid vehicle (HEV) including an internal combustion engine in addition to an electric motor for driving the vehicle 100. Further, for example, the vehicle 100 may be configured to have two MGs: one MG mainly used for driving the vehicle 100, and the other MG mainly used for power generation.

<Configuration of In-Vehicle Temperature Control System>

Figure 2:
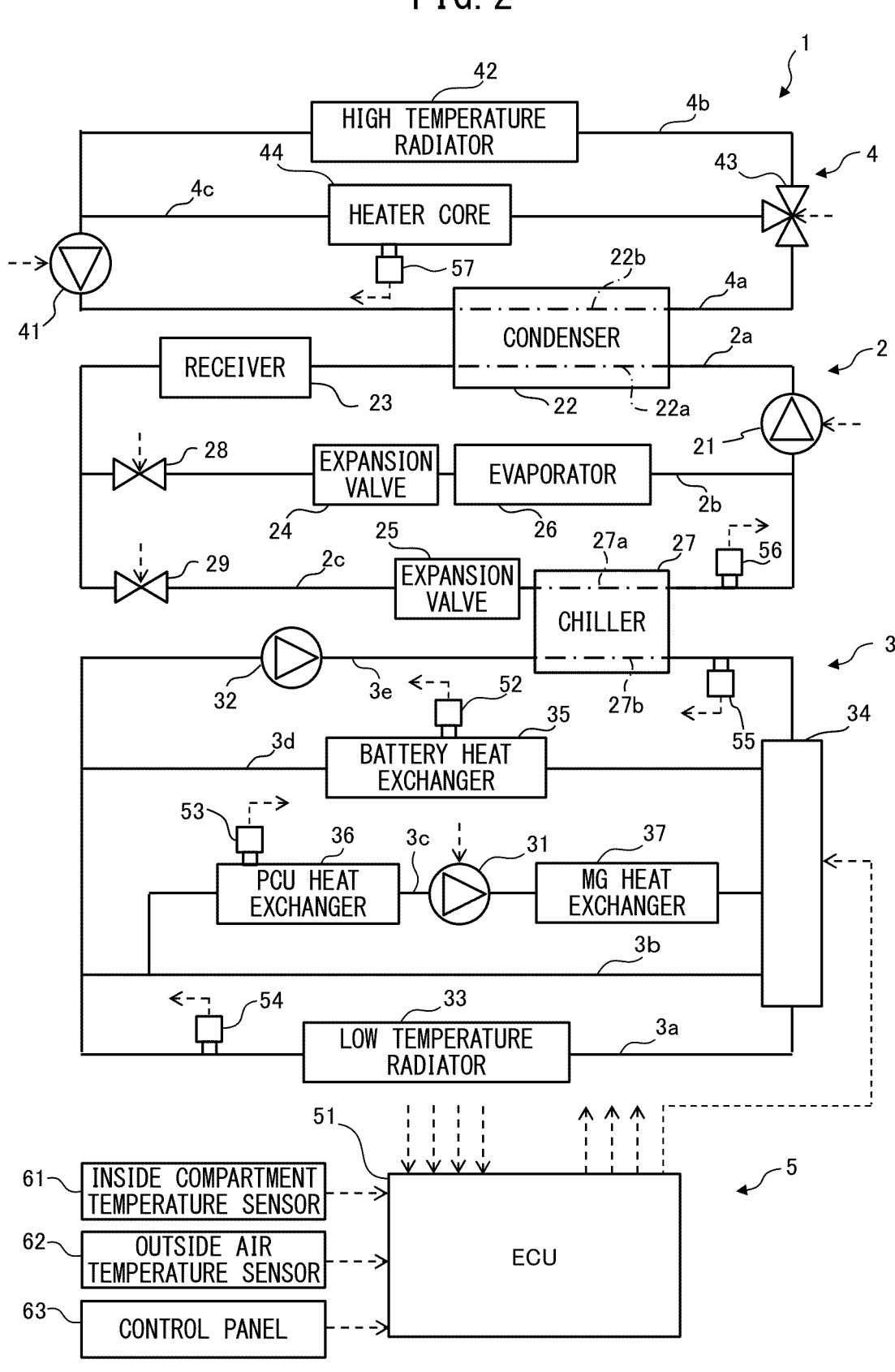
FIG. 2 is a configuration diagram schematically illustrating the in-vehicle temperature control system.
Figure 3:
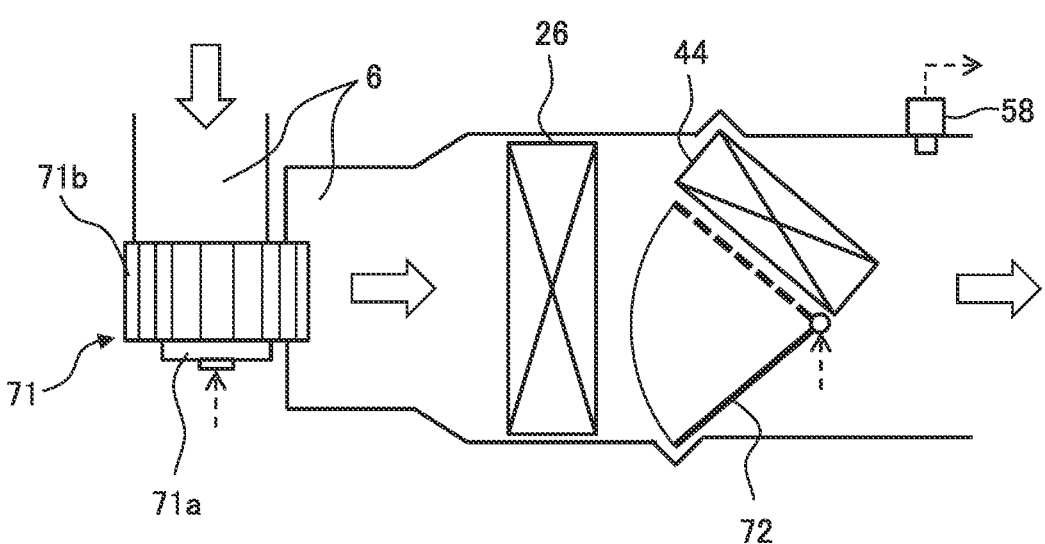
FIG. 3 is a configuration diagram schematically illustrating an air passage for air conditioning of the vehicle equipped with the in-vehicle temperature control system.

Referring to FIGS. 1 to 3, a configuration of an in-vehicle temperature control system 1 according to an embodiment will be described. FIG. 2 is a configuration diagram schematically showing the in-vehicle temperature control system 1. The in-vehicle temperature control system 1 includes a refrigeration circuit 2, a low-temperature circuit 3 (first thermal circuit), a high-temperature circuit 4 (second thermal circuit), and a control device 5. The refrigeration circuit 2, the low-temperature circuit 3, and the high-temperature circuit 4 function as a thermal circuit that transfers heat from or to the outside of the circuit.

<<Refrigeration Circuit>>

First, the refrigeration circuit 2 will be described. The refrigeration circuit 2 includes a compressor 21, a refrigerant pipe 22a of a condenser 22, a receiver 23, a first expansion valve 24, a second expansion valve 25, an evaporator 26, a refrigerant pipe 27a of a chiller 27, a first electromagnetic regulation valve 28, and a second electromagnetic regulation valve 29. The refrigeration circuit 2 is configured to realize a refrigeration cycle by circulating refrigerant through these components when the compressor 21 is driven. As the refrigerant, for example, a hydrofluorocarbon (e.g., HFC-134a) or any other material generally used as a refrigerant in a refrigeration cycle is used.

Further, the refrigeration circuit 2 includes a refrigeration basic flow path 2a, an evaporator flow path 2b, and a chiller flow path 2c. The evaporator flow path 2b and the chiller flow path 2c are provided in parallel to each other, and are connected to the refrigeration basic flow path 2a.

In the refrigeration basic flow path 2a, the compressor 21, the refrigerant pipe 22a of the condenser 22, and the receiver 23 are provided in this order in the circulation direction of the refrigerant. In the evaporator flow path 2b, the first electromagnetic regulation valve 28, the first expansion valve 24, and the evaporator 26 are provided in this order in the circulation direction of the refrigerant. On the other hand, in the chiller flow path 2c, the second electromagnetic regulation valve 29, the second expansion valve 25, and the refrigerant pipe 27a of the chiller 27 are provided in this order.

The compressor 21 functions as a compressor that compresses a refrigerant, and is an example of a heat absorption amount change device (hereinafter, referred to as a "heat absorption amount change device") capable of changing a heat absorption amount of the chiller 27 from the cooling water to the refrigerant. In particular, the compressor 21 is an example of a device for changing the heat absorption amount relating to the refrigeration circuit 2. In the present embodiment, the compressor 21 is of an electric type, and is configured such that the discharge capacity thereof can be changed steplessly by adjusting the power supplied to the compressor 21. Therefore, the compressor 21 can change the flow rate of the refrigerant in the refrigeration circuit 2. In the compressor 21, the low-temperature, low-pressure and mainly gaseous refrigerant flowing out from the evaporator

26 or the chiller 27 is adiabatically compressed, thereby being changed to a high-temperature, high-pressure and mainly gaseous refrigerant.

The condenser 22 has a refrigerant pipe 22a and a cooling water pipe 22b. The condenser 22 functions as a heat exchanger (second heat exchanger) that dissipates heat from the refrigerant to the cooling water flowing through the cooling water pipe 22b of the high-temperature circuit 4 described later to condense the refrigerant. Therefore, the refrigerant pipe 22a of the condenser 22 functions as a condenser that condenses the refrigerant in the refrigeration cycle. Further, in the refrigerant pipe 22a of the condenser 22, the high-temperature, high-pressure and mainly gaseous refrigerant that has flowed out from the compressor 21 is cooled in an isobaric manner, thereby being changed to the high-temperature, high-pressure and mainly liquid refrigerant.

The receiver 23 stores the refrigerant condensed by the refrigerant pipe 22a of the condenser 22. In addition, since the condenser 22 cannot necessarily liquefy all of the refrigerant, the receiver 23 is configured to separate the gas and liquid. Only the liquid refrigerant in which the gaseous refrigerant is separated flows out from the receiver 23.

The first expansion valve 24 and the second expansion valve 25 function as an expander for expanding the refrigerant, and are an example of a heat absorption amount change device related to the refrigeration circuit 2. The expansion valves 24 and 25 include, for example, thin passages, and rapidly reduce the pressure of the refrigerant by spraying the refrigerant from the thin passages. In particular, the expansion valves 24 and 25 are configured such that the lower the opening degree thereof, the lower the pressure of the refrigerant. Therefore, the expansion valves 24 and 25 can change the degree of superheat of the refrigerant flowing into the evaporator 26 or the chiller 27. The first expansion valve 24 sprays the liquid refrigerant supplied from the receiver 23 into the evaporator 26 in a mist form. Similarly, the second expansion valve 25 sprays the liquid refrigerant supplied from the receiver 23 into the refrigerant pipe 27a of the chiller 27 in a mist form. In the expansion valves 24 and 25, the high-temperature, high-pressure and liquid refrigerant flowing out from the receiver 23 is changed to a low-temperature, low-pressure and atomized refrigerant by being depressurized and partially vaporized.

The evaporator 26 functions as an evaporator that makes the refrigerant absorb heat and evaporates the refrigerant, and is an example of a heat absorption amount change device related to the refrigeration circuit 2. Specifically, the evaporator 26 absorbs heat from the air around the evaporator 26 to the refrigerant, and evaporates the refrigerant. Therefore, in the evaporator 26, the low-temperature, low-pressure and atomized refrigerant flowing out from the first expansion valve 24 is changed to the low-temperature, low-pressure and gaseous refrigerant by evaporation. As a result, the air around the evaporator 26 is cooled, and the interior of the vehicle 100 can be cooled.

The chiller 27 includes a refrigerant pipe 27a and a cooling water pipe 27b. The chiller 27 functions as a heat exchanger (first heat exchanger) that absorbs heat from the cooling water flowing through the cooling water pipe 27b of the low-temperature circuit 3, which will be described later, to the refrigerant and evaporates the refrigerant. The refrigerant pipe 27a of the chiller 27 functions as an evaporator for evaporating the refrigerant. Further, in the refrigerant pipe 27a of the chiller 27, the low-temperature, low-pressure and atomized refrigerant flowing out from the second expansion valve 25 is changed to the low-temperature, low-pressure and gaseous refrigerant by evaporating. As a result, the cooling water of the low-temperature circuit 3 is cooled.

The first electromagnetic regulation valve 28 and the second electromagnetic regulation valve 29 are used to change the flow mode of the refrigerant in the refrigeration circuit 2. As the opening degree of the first electromagnetic regulation valve 28 increases, the flow rate of refrigerant flowing into the evaporator flow path 2b increases, and thus the flow rate of refrigerant flowing into the evaporator 26 increases. Further, as the opening degree of the second electromagnetic regulation valve 29 increases, the flow rate of refrigerant flowing into the chiller flow path 2c increases, and thus the flow rate of refrigerant flowing into the chiller 27 increases. As long as the flow rate flowing from the refrigeration basic flow path 2a into the evaporator flow path 2b and the chiller flow path 2c can be adjusted, any valve may be provided instead of the electromagnetic regulation valves 28 and 29.

In the present embodiment, the refrigeration circuit 2 includes a condenser 22 as a heat exchanger that discharges heat from the refrigerant in the refrigeration circuit 2 to the outside. However, the refrigeration circuit 2 may include other heat exchangers that release heat from the refrigerant to the outside (e.g., outside air).

<<Low-Temperature Circuit>>

Next, the low-temperature circuit 3 will be described. The low-temperature circuit 3 includes a first pump 31, a second pump 32, a cooling water pipe 27b of the chiller 27, a low-temperature radiator 33, and a five-way valve 34. In addition, the low-temperature circuit 3 includes a battery heat exchanger 35, a PCU heat exchanger 36 and a MG heat exchanger 37. In the low-temperature circuit 3, cooling water circulates through these components. The cooling water flowing in the low-temperature circuit 3 is an example of the first heat medium, and any other heat medium may be used in the low-temperature circuit 3 instead of the cooling water.

The low-temperature circuit 3 includes a low-temperature radiator flow path 3a, a circulation flow path 3b, a heat generating device flow path 3c, a battery flow path 3d, and a chiller flow path 3e. One ends of the low-temperature radiator flow path 3a, the circulation flow path 3b, the heat generating device flow path 3c, the battery flow path 3d, and the chiller flow path 3e is connected to the five-way valve 34 so as to be parallel to each other. The other ends of the low-temperature radiator flow path 3a, the circulation flow path 3b, the battery flow path 3d, and the chiller flow path 3e are connected to each other. The other end of the heat generating device flow path 3c is connected to the circulation flow path 3b.

A low-temperature radiator 33 is provided in the low-temperature radiator flow path 3a. The PCU heat exchanger 36, the first pump 31, and the MG heat exchanger 37 are provided in this order in the circulation direction of the cooling water in the heat generating device flow path 3c. The heat generating device flow path 3c may be provided with a heat exchanger that exchanges heat with a heat generating device other than the PCU 112 and the MG 110. The battery heat-exchanger 35 is provided in the battery flow path 3d. In the chiller flow path 3e, the second pump 32 and the cooling water pipe 27b of the chiller 27 are provided in this order in the circulation direction of the cooling water.

The first pump 31 and the second pump 32 pump the cooling water circulating in the low-temperature circuit 3. Therefore, the first pump 31 and the second pump 32 can change the flow rate of the cooling water flowing in the low-temperature circuit 3. Therefore, the first pump 31 and the second pump 32 are examples of the heat absorption amount change device related to the low-temperature circuit 3. In the present embodiment, the first pump 31 and the second pump 32 are electric water pumps, and are configured such that the discharge capacity thereof is changed steplessly by adjusting the supply power or the duty ratio to the first pump 31 and the second pump 32.

The low-temperature radiator 33 is a heat exchanger that exchanges heat between the cooling water circulating in the low-temperature circuit 3 and the air (outside air) outside the vehicle 100, and is therefore an example of an external heat exchanger that radiates heat from the cooling water to the outside or absorbs heat from the outside to the cooling water. The low-temperature radiator 33 is configured to radiate heat from the cooling water to the outside air when the temperature of the cooling water is higher than the temperature of the outside air, and to absorb heat from the outside air to the cooling water when the temperature of the cooling water is lower than the temperature of the outside air.

The five-way valve 34 controls the flow mode of the cooling water circulating in the low-temperature circuit 3. The five-way valve 34 is connected to the low-temperature radiator flow path 3a, the circulation flow path 3b, the heat generating device flow path 3c, the battery flow path 3d, and the chiller flow path 3e. Then, the five-way valve 34 connects these flow paths by any combination. In the present embodiment, the five-way valve 34 is configured to be capable of setting a plurality of connection states including the first state to the fourth state. The first state is a connection state in which the circulation flow path 3b and the heat generating device flow path 3c are connected to each other, the battery flow path 3d and the chiller flow path 3e are connected to each other, and the other flow paths are not connected to each other. The second state is a connection state in which the low-temperature radiator flow path 3a and the chiller flow path 3e are connected to each other, the circulation flow path 3b and the heat generating device flow path 3c are connected to each other, and the other flow paths are not connected to each other. The third state is a connection state in which the low-temperature radiator flow path 3a and the heat generating device flow path 3c are connected to each other, the battery flow path 3d and the chiller flow path 3e are connected to each other, and the other flow paths are not connected to each other. The fourth state is a connection state in which the low-temperature radiator flow path 3a, the circulation flow path 3b, the heat generating device flow path 3c, and the chiller flow path 3e are connected to each other, and the battery flow path 3d is not connected to any other flow path. Although the five-way valve 34 is used in the present embodiment, as long as it is possible to set the connection state of the low-temperature circuit 3 to the first state to the fourth state, a flow mode control device other than the five-way valve, such as two three-way valves, may be provided.

The battery heat exchanger 35 is an example of an external heat exchanger that absorbs heat from the outside to the cooling water, and is an example of a heat absorption amount change device related to the low-temperature circuit 3. In particular, the battery heat exchanger 35 is configured to exchange heat between the battery 114 of the vehicle 100, which is a heat generating device (external heat source), and the cooling water. Specifically, the battery heat exchanger 35 includes, for example, a pipe provided around the battery 114, and heat exchange is performed between the cooling water flowing through the pipe and the battery 114.

Further, the PCU heat exchanger 36 is an example of an external heat exchanger that absorbs heat from the outside to the cooling water, and is an example of a heat absorption amount change device related to the low-temperature circuit 3. In particular, the PCU heat exchanger 36 is configured to exchange heat between the PCU 112 of the vehicle 100, which is heat generating devices (external heat sources), and the cooling water. Specifically, the PCU heat exchanger 36 includes a pipe provided around the PCU 112, and is configured such that heat is exchanged between the cooling water flowing through the pipe and the PCU 112.

The MG heat exchanger 37 is an example of an external heat exchanger that absorbs heat from the outside to the cooling water, and is an example of a heat absorption amount change device related to the low-temperature circuit 3. In particular, the MG heat exchanger 37 functions as a heat exchanger for a heat generating device that exchanges heat between the MG 110 (or motor) of the vehicle 100, which is a heat generating device (external heat source), and the cooling water. Specifically, the MG heat exchanger 37 includes pipes provided around the MG 110 and around the cooling water, oil flowing in these pipes (third heat medium), and an oil pump that circulates the oil in these pipes. In the MG heat exchanger 37, the oil pump is driven and oil flows in the pipe, so that heat is exchanged between the MG 110 and the cooling water. Therefore, the oil pump is configured to heat-exchange between the MG 110 and the cooling water of the low-temperature circuit 3 via the oil. As a result, the oil pump can change the heat absorption amount in the MG heat exchanger 37. The oil pump is an example of a heat absorption amount change device related to the low-temperature circuit 3.

<<High-Temperature Circuit>>

Next, the high-temperature circuit 4 will be described. The high-temperature circuit 4 includes a third pump 41, a cooling water pipe 22b of the condenser 22, a high-temperature radiator 42, a three-way valve 43, and a heater core 44. The high-temperature circuit 4 also circulates cooling water through these components. Note that this cooling water is an example of the second heating medium, and any other heating medium may be used in the high-temperature circuit 4 instead of the cooling water.

The high-temperature circuit 4 also includes a high-temperature basic flow path 4a, a high-temperature radiator flow path 4b, and a heater flow path 4c. The high-temperature radiator flow path 4b and the heater flow path 4c are connected to the high-temperature basic flow path 4a in parallel with each other.

In the high-temperature basic flow path 4a, the third pump 41 and the cooling water pipe 22b of the condenser 22 are provided in this order in the circulation direction of the cooling water. The high-temperature radiator 42 is provided in the high-temperature radiator flow path 4b, and a heater core 44 is provided in the heater flow path 4c. The three-way valve 43 is provided between the high-temperature basic flow path 4a, the high-temperature radiator flow path 4b, and the heater flow path 4c.

The third pump 41 pumps the cooling water circulating in the high-temperature circuit 4. In the present embodiment, the third pump 41 is an electric water pump similar to the first pump 31 and the second pump 32. The high-temperature radiator 42 is, similarly to the low-temperature radiator 33, a heat exchanger that exchanges heat between the cooling water circulating in the high-temperature circuit 4 and the outside air.

The three-way valve 43 controls a flow mode of the cooling water flowing out from the cooling water pipe 22b of the condenser 22. The three-way valve 43 is configured so that a flow destination can be selectively changed between the high-temperature radiator flow path 4b and the heater flow path 4c. When the three-way valve 43 is set to a side of the high-temperature radiator flow path 4b, the cooling water flowing out from the cooling water pipe 22b of the condenser 22 flows through the high-temperature radiator flow path 4b. On the other hand, when the three-way valve 43 is set to a side of the heater flow path 4c, the cooling water flowing out from the cooling water pipe 22b of the condenser 22 flows through the heater core 44. Note that, as long as the flow rate of the cooling water flowing into the high-temperature radiator flow path 4b and the heater flow path 4c can be appropriately adjusted, other flow mode control devices such as a regulating valve and an on-off valve may be used instead of the three-way valve 43.

The heater core 44 is configured to perform heat exchange between the cooling water circulating in the high-temperature circuit 4 and the air around the heater core 44 to perform heating of the interior of the vehicle 100. Specifically, the heater core 44 is configured to exhaust heat from the cooling water to the air around the heater core 44. Therefore, when the high-temperature cooling water flows through the heater core 44, the temperature of the cooling water decreases and the air around the heater core 44 is warmed.

Note that the high-temperature circuit 4 according to the present embodiment is not provided with an electric heater that heats the cooling water in the high-temperature circuit 4. Therefore, the cooling water in the high-temperature circuit 4 is basically heated by the heat transferred from the refrigerant at the condenser 22.

The low-temperature radiator 33 and the high-temperature radiator 42 are disposed inside the front grille of the vehicle 100, as shown in FIG. 1. Therefore, when the vehicle 100 is traveling, the radiators 33 and 42 are hit by the traveling wind. Further, a fan 76 is provided adjacent to the radiators 33 and 42. When driven, the fan 76 is configured to hit the radiators 33, 42 with wind. Therefore, even when the vehicle 100 is not traveling, the radiators 33 and 42 can be hit with wind by driving the fan 76.

<<Air Passage>>

FIG. 3 is a configuration diagram schematically showing the air passage 6 for air conditioning of the vehicle 100 equipped with the in-vehicle temperature conditioning system 1. In the air passage 6, air flows in a direction indicated by arrows in the drawing. The air passage 6 shown in FIG. 3 is connected to an air inlet of the outside or an interior of the vehicle 100, and the outside air or the interior air flows into the air passage 6 in accordance with a control state by the control device 5. Further, the air passage 6 shown in FIG. 3 is connected to a blow-off port for blowing air into the interior of the vehicle 100, and air is supplied from the air passage 6 to an arbitrary blow-off port in accordance with a control state by the control device 5.

As shown in FIG. 3, in the air passage 6 for air conditioning of the present embodiment, a blower 71, an evaporator 26, an air mix door 72, and a heater core 44 are provided in this order in the air flow direction.

The blower 71 includes a blower motor 71a and a blower fan 71b. The blower 71 is configured such that when the blower fan 71b is driven by the blower motor 71a, the outside air or the interior air flows into the air passage 6, and the air flows through the air passage 6.

The air mix door 72 adjusts the flow rate of the air flowing through the heater core 44 among the air flowing through the air passage 6. The air mix door 72 is configured to be able to adjust between a state in which all air flowing through the air passageway 6 flows through the heater core 44, a state in which all air flowing through the air passageway 6 does not flow through the heater core 44, and a state in between.

In the air passage 6 configured as described above, when the refrigerant is flowing through the evaporator 26 while the blower 71 is being driven, the air flowing through the air passage 6 is cooled. Therefore, the cooling of the interior is performed. Further, when the cooling water flows through the heater core 44 and the air mix door 72 is controlled so that air flows through the heater core 44 while the blower 71 is being driven, the air flowing through the air passage 6 is warmed. Therefore, the heating of the interior is performed.

<<Control Device>>

Referring to FIG. 2, the control device 5 includes an electronic control unit (ECU) 51. The ECU 51 includes a processor that performs various operations, a memory that stores programs and various types of information, and interfaces that are connected to various types of actuators and sensors.

Further, the control device 5 includes a battery water temperature sensor (temperature detector) 52 for detecting the temperature of the cooling water flowing through the battery heat exchanger 35, a PCU water temperature sensor (temperature detector) 53 for detecting the temperature of the cooling water flowing through the PCU heat exchanger 36, a radiator water temperature sensor (temperature detector) 54 for detecting the temperature of the cooling water flowing through the low-temperature radiator 33, and a chiller water temperature sensor 55 (temperature detector) for detecting the temperature of the cooling water flowing through the chiller 27. In addition, the control device 5 includes a temperature and pressure sensor 56 for detecting the temperature and pressure of the refrigerant flowing through the chiller 27, a heater core water temperature sensor 57 for detecting the temperature of the cooling water flowing through the heater core 44, and a blowout temperature sensor 58 (FIG. 3) for detecting the temperature of the air flowing out from the air passage 6 into the interior. The control device 5 further includes an indoor temperature sensor 61 that detects the temperature inside the vehicle 100, an outdoor air temperature sensor 62 that detects the temperature outside the vehicle 100, an operation panel 63 that is operated by a user, and a battery temperature sensor 64 (FIG. 1) that detects the temperature of the battery 114. The ECU 51 is connected to the sensors and the operation panel 63, and output signals from the sensors and the operation panel 63 are input to the ECU 51.

The ECU 51 determines whether or not there is a cooling request and a heating request based on, for example, the output signals from the indoor temperature sensor 61, the outdoor air temperature sensor 62, and the operation panel 63. For example, when the user turns ON the heating switch of the operation panel 63, the ECU 51 determines that heating is required. When the user turns ON the auto-switch of the operation panel 63, for example, the ECU 51 determines that heating is required when the target interior temperature set by the user is higher than the temperature detected by the indoor temperature sensor 61. In addition, the ECU 51 determines whether or not there is a cooling request of the battery 114, based on the output of the battery temperature sensor 64. For example, when the temperature of the battery 114 is equal to or higher than the cooling reference temperature, the ECU 51 determines that cooling of the battery 114 is required.

The ECU 51 is connected to various actuators of the in-vehicle temperature control system 1 to control these actuators. Specifically, the ECU 51 is connected to and controls the compressor 21, the electromagnetic regulation valves 28 and 29, the pumps 31, 32, and 41, the oil pump of the MG exchanger 37, the five-way valve 34, the three-way valve 43, the blower motor 71a, the air mix door 72, and the fan 76. Therefore, the ECU 51 functions as a control device that controls the devices related to the heat medium (the refrigerant and the cooling water) in the refrigeration circuit 2, the low-temperature circuit 3, and the high-temperature circuit 4.

<Flow Mode of In-Vehicle Temperature Control System>

Next, with reference to FIGS. 4 to 8, a typical flow mode of the heat medium (refrigerant and cooling water) in the in-vehicle temperature control system 1 will be described. In FIG. 4 to FIG. 8, the flow paths through which the refrigerant or the cooling water are flowing is indicated by a solid line, and the flow paths through which the refrigerant or the cooling water are not flowing is indicated by a broken line. Further, the thin arrows in the drawing indicate the direction in which the refrigerant and the cooling water flow, and the thick arrows in the drawing indicate the direction in which the heat moves. In the present embodiment, the cooling requirements for the PCU 112 and the MG 110 are always present, and therefore, the cooling water is constantly circulated through the PCU heat exchanger 36 and the MG heat exchanger 37 regardless of the flow mode of the heat medium.

<<Stop Mode>>

Figure 4:
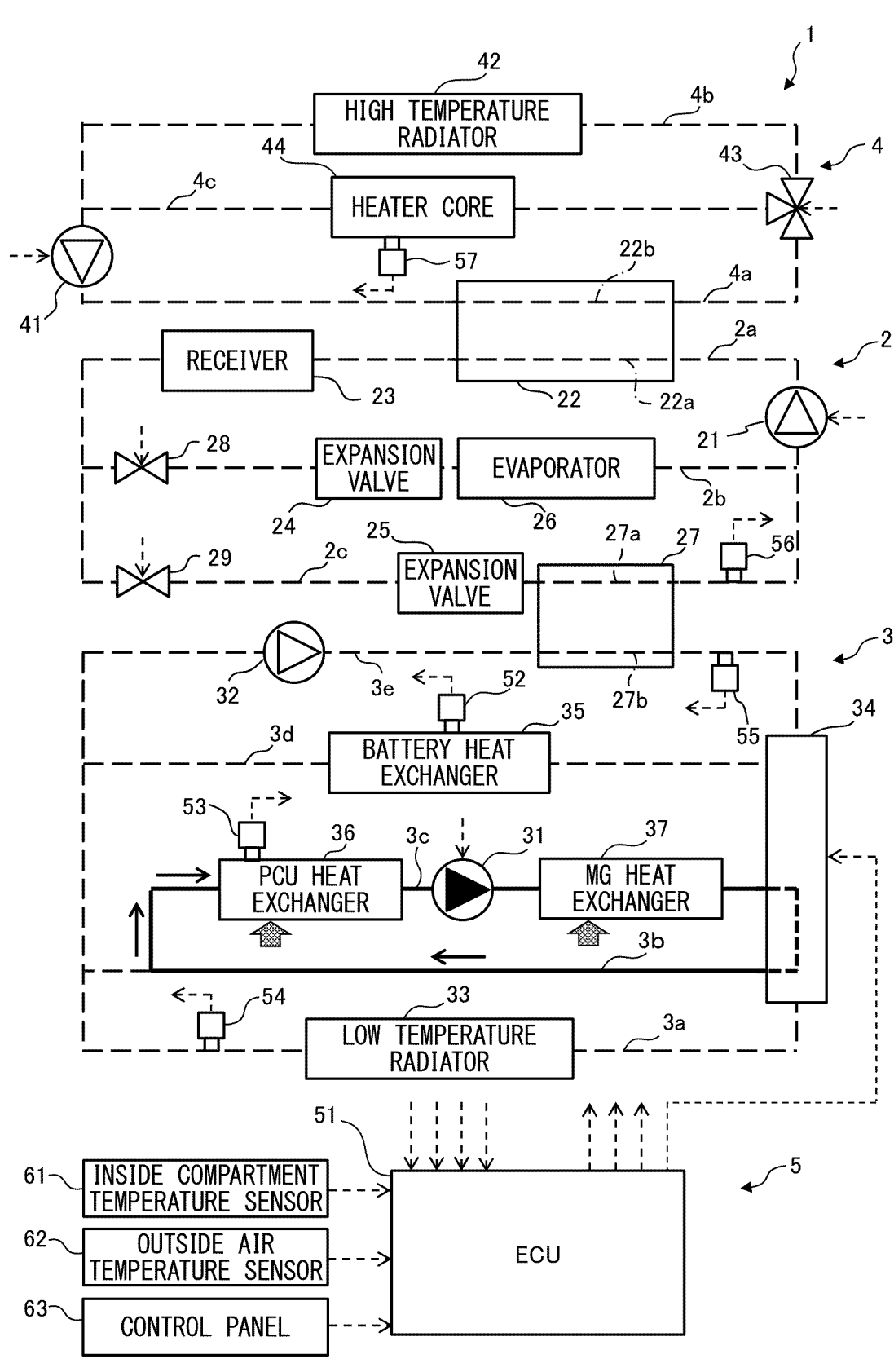
FIG. 4 is a diagram schematically illustrating one flow mode (first stop mode) of a heat medium.
Figure 5:
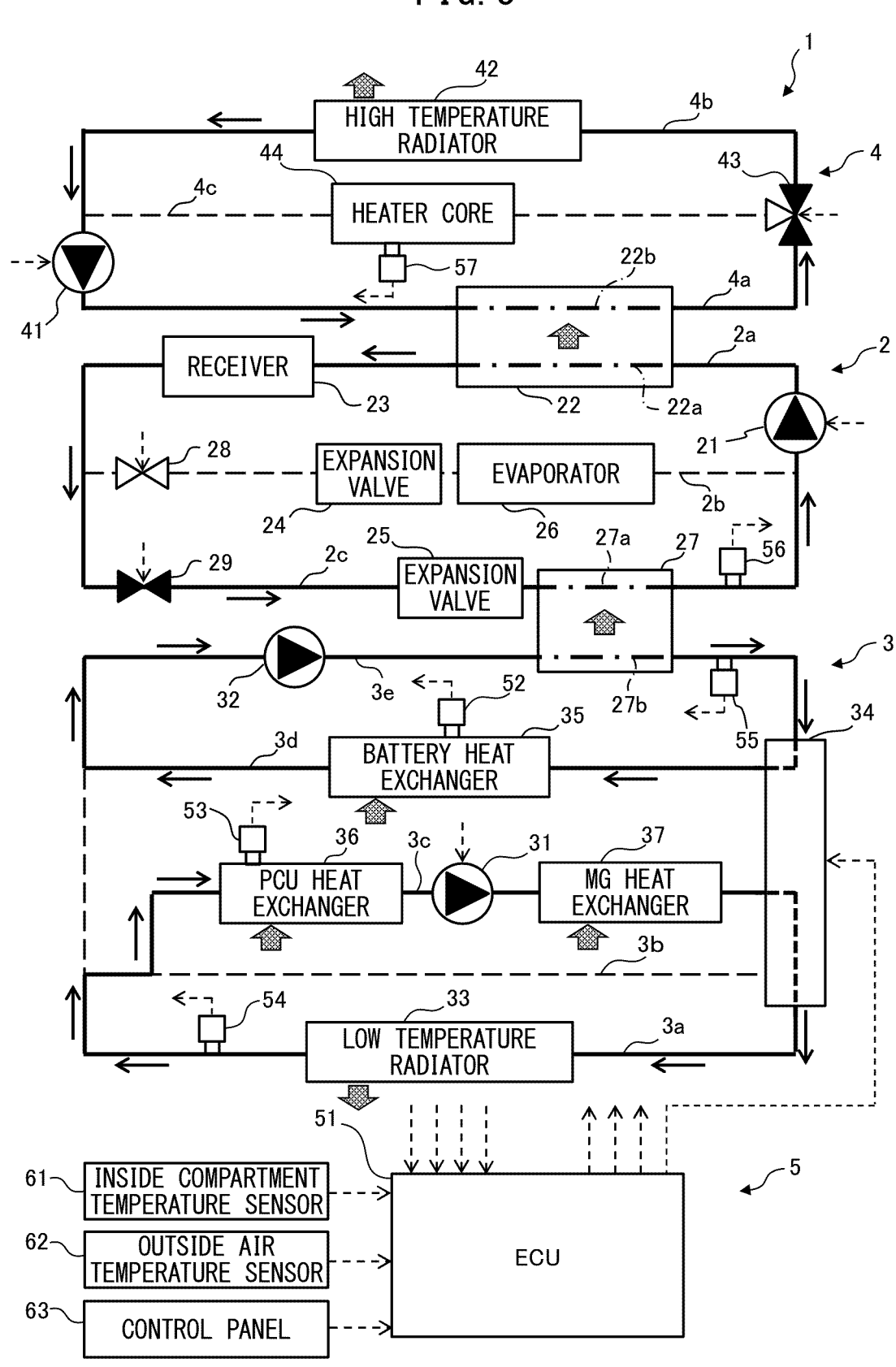
FIG. 5 is a diagram schematically illustrating one flow mode (second stop mode) of the heat medium.

First, with reference to FIGS. 4 and 5, a flow mode (stop mode) of the heat medium when neither the cooling request nor the heating request is described. FIG. 4 is a diagram schematically illustrating a flow mode (first stop mode) of the heat medium in a case where neither the cooling request nor the heating request nor the cooling request of the battery 114 is present. Therefore, in the first stop mode, the PCU 112 and the MG 110 are cooled and the battery 114 is not cooled.

As shown in FIG. 4, in the first stop mode, the first pump 31 of the low-temperature circuit 3 is operated and the second pump 32 is stopped. In addition, in the first stop mode, the five-way valve 34 is set to a first state in which the circulation flow path 3b and the heat generating device flow path 3c are connected. Consequently, in the low-temperature circuit 3, the cooling water circulates through the PCU heat exchanger 36 and the MG heat exchanger 37. On the other hand, in the first stop mode, the compressor 21 and the third pump 41 are stopped. Therefore, the refrigerant does not circulate in the refrigeration circuit 2, and the cooling water does not circulate in the high-temperature circuit 4.

Consequently, in the first stop mode, heat is absorbed from the PCU 112 to the cooling water at the PCU heat exchanger 36, and heat is absorbed from the MG 110 to the cooling water at the MG heat exchanger 37. The heat absorbed by the cooling water is discharged to the outside air while circulating through the low-temperature circuit 3. Therefore, in the first stop mode, heat is absorbed from the PCU 112 and the MG 110, and the heat is released in the low-temperature circuit 3. In the first stop mode, the five-way valve 34 may be set to a third state in which the low-temperature radiator flow path 3a and the heat generating device flow path 3c are connected (see FIG. 5).

FIG. 5 is a diagram schematically illustrating a flow mode (second stop mode) of the heat medium in a case where there is neither a cooling request nor a heating request and there is a cooling request of the battery 114. Therefore, in the second stop mode, the PCU 112, the MG 110 and the battery 114 are cooled.

As shown in FIG. 5, in the second stop mode, the first pump 31 and the second pump 32 of the low-temperature circuit 3 are operated. In addition, in the second stop mode, the five-way valve 34 is set to a third state in which the low-temperature radiator flow path 3*a* and the heat generating device flow path 3*c* are connected to each other and the battery flow path 3*d* and the chiller flow path 3*e* are connected to each other. Consequently, in the low-temperature circuit 3, the cooling water circulates through the PCU heat exchanger 36, the MG heat exchanger 37, and the low-temperature radiator 33. In addition, another cooling water in the low-temperature circuit 3 circulates through the battery heat exchanger 35 and the chiller 27.

In addition, in the second stop mode, the compressor 21 of the refrigeration circuit 2 is operated, the first electromagnetic regulation valve 28 is closed, and the second electromagnetic regulation valve 29 is opened. Therefore, in the refrigeration circuit 2, the refrigerant circulates through the chiller 27 and the condenser 22 without passing through the evaporator 26. Further, in the second stop mode, the third pump 41 of the high-temperature circuit 4 is operated and the three-way valve 43 is set such that cooling water flows through the high-temperature radiator 42 without passing through the heater core 44.

Consequently, in the second stop mode, heat is absorbed from the PCU 112 and the MG 110 to the cooling water at the PCU heat exchanger 36 and the MG heat exchanger 37, and the heat is released in the low-temperature radiator 33. In addition, in the second stop mode, heat is absorbed from the battery 114 at the battery heat exchanger 35, and heat is transferred from the cooling water of the low-temperature circuit 3 to the refrigerant of the refrigeration circuit 2 at the chiller 27. Further, in the second stop mode, at the condenser 22, heat is transferred from the refrigerant of the refrigeration circuit 2 to the cooling water of the high-temperature circuit 4, and the heat is discharged to the outside air at the high-temperature radiator 42. Therefore, in the second stop mode, heat is absorbed from the PCU 112 and the MG 110, and the heat is released at the low-temperature radiator 33. In addition, heat is absorbed from the battery 114 at the battery heat exchanger 35 and released at the high temperature radiator 42. In the second stop mode, the five-way valve 34 may be set to a first state in which the circulation flow path 3*b* and the heat generating device flow path 3*c* are connected to each other (see FIG. 4).

<<Cooling Mode>>

Figure 6:
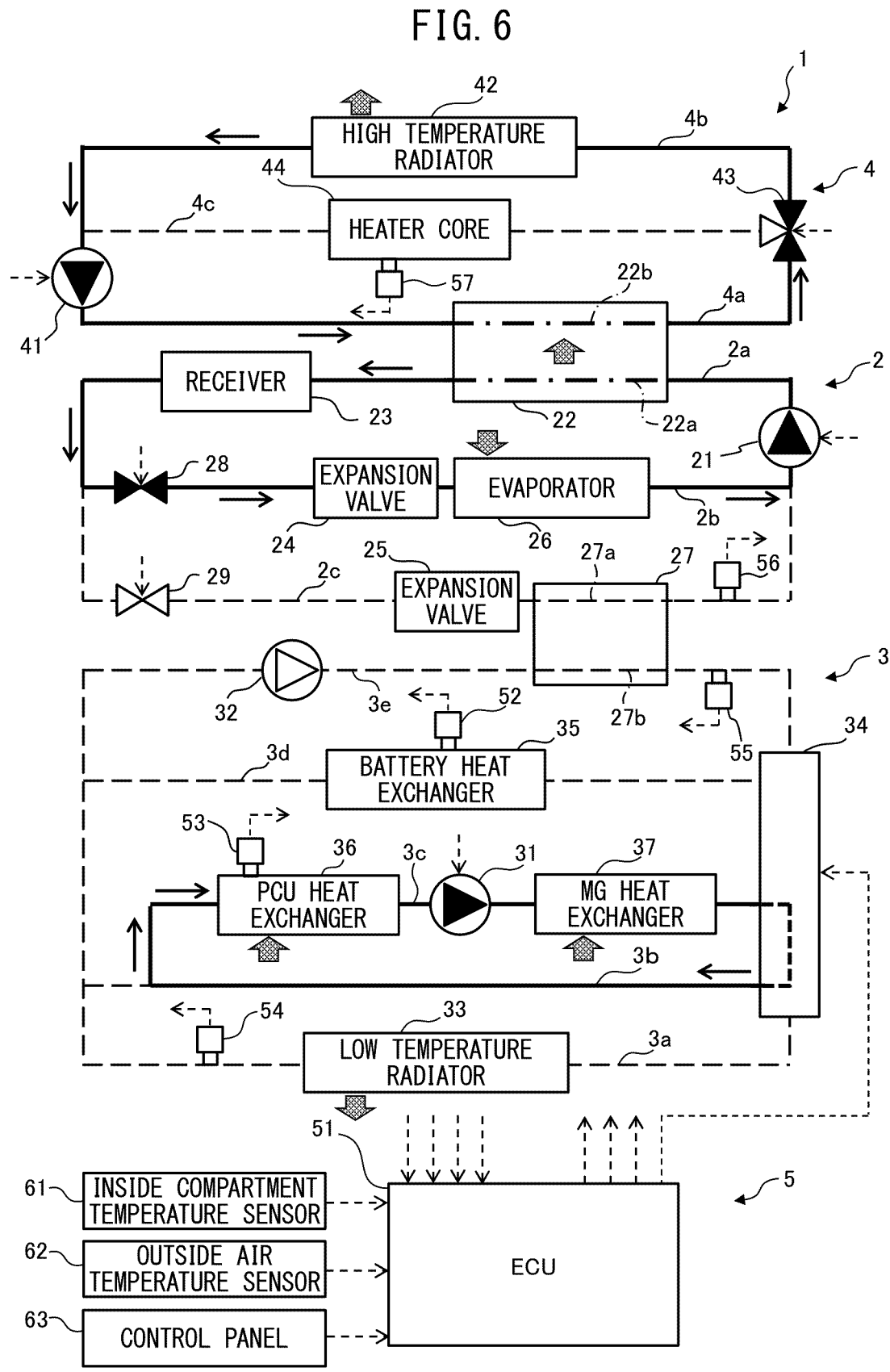
FIG. 6 is a diagram schematically illustrating one flow mode (cooling mode) of the heat medium.

Next, with reference to FIG. 6, a flow mode (cooling mode) of the heat medium when there is a cooling request will be described. FIG. 6 is a diagram schematically illustrating a flow mode (cooling mode) of the heat medium in a case where there is a cooling request and there is no cooling request for the battery 114. Therefore, in the cooling mode shown in FIG. 6, the cooling is performed and the PCU 112 and the MG 110 are cooled.

As shown in FIG. 6, in the cooling mode, the first pump 31 of the low-temperature circuit 3 is operated and the second pump 32 is stopped. In addition, in the cooling mode, the five-way valve 34 is set to a first state in which circulation flow path 3*b* and the heat generating device flow path 3*c* are connected to each other. Consequently, in the low-temperature circuit 3, the cooling water circulates through the PCU heat exchanger 36 and the MG heat exchanger 37.

In addition, in the cooling mode, the compressor 21 of the refrigeration circuit 2 is operated, the first electromagnetic regulation valve 28 is opened, and the second electromagnetic regulation valve 29 is closed. Therefore, in the refrigeration circuit 2, the refrigerant circulates through the evaporator 26 and the condenser 22 without passing through the chiller 27. Further, in the cooling mode, the third pump 41 of the high-temperature circuit 4 is operated, and the three-way valve 43 is set so that the cooling water flows through the high-temperature radiator 42 without passing through the heater core 44.

Consequently, in the cooling mode, heat is absorbed from the PCU 112 and the MG 110, and the heat is released in the low-temperature circuit 3. In addition, in the cooling mode, heat is absorbed from the ambient air to the refrigerant at the evaporator 26, and the heat is transferred from the refrigerant to the cooling water of the high-temperature circuit 4 at the condenser 22. In the high-temperature circuit 4, the heat absorbed to the cooling water at the condenser 22 is released in the high-temperature radiator 42. Therefore, in the cooling mode, heat is absorbed from the surrounding air flowing through the air passage 6 in the evaporator 26, cooling of the interior of the vehicle 100 is performed, and the heat is released at the high-temperature radiator 42.

When there is a cooling request for the battery 114, in the cooling mode, the second pump 32 may be driven and the cooling water may be circulated between the chiller 27 and the battery heat exchanger 35 in the same manner as in the example shown in FIG. 5. In this case, in addition to the first electromagnetic regulation valve 28, the second electromagnetic regulation valve 29 is also opened, whereby a part of the refrigerant circulates through the chiller 27.

<<Heating Mode>>

Figure 7:
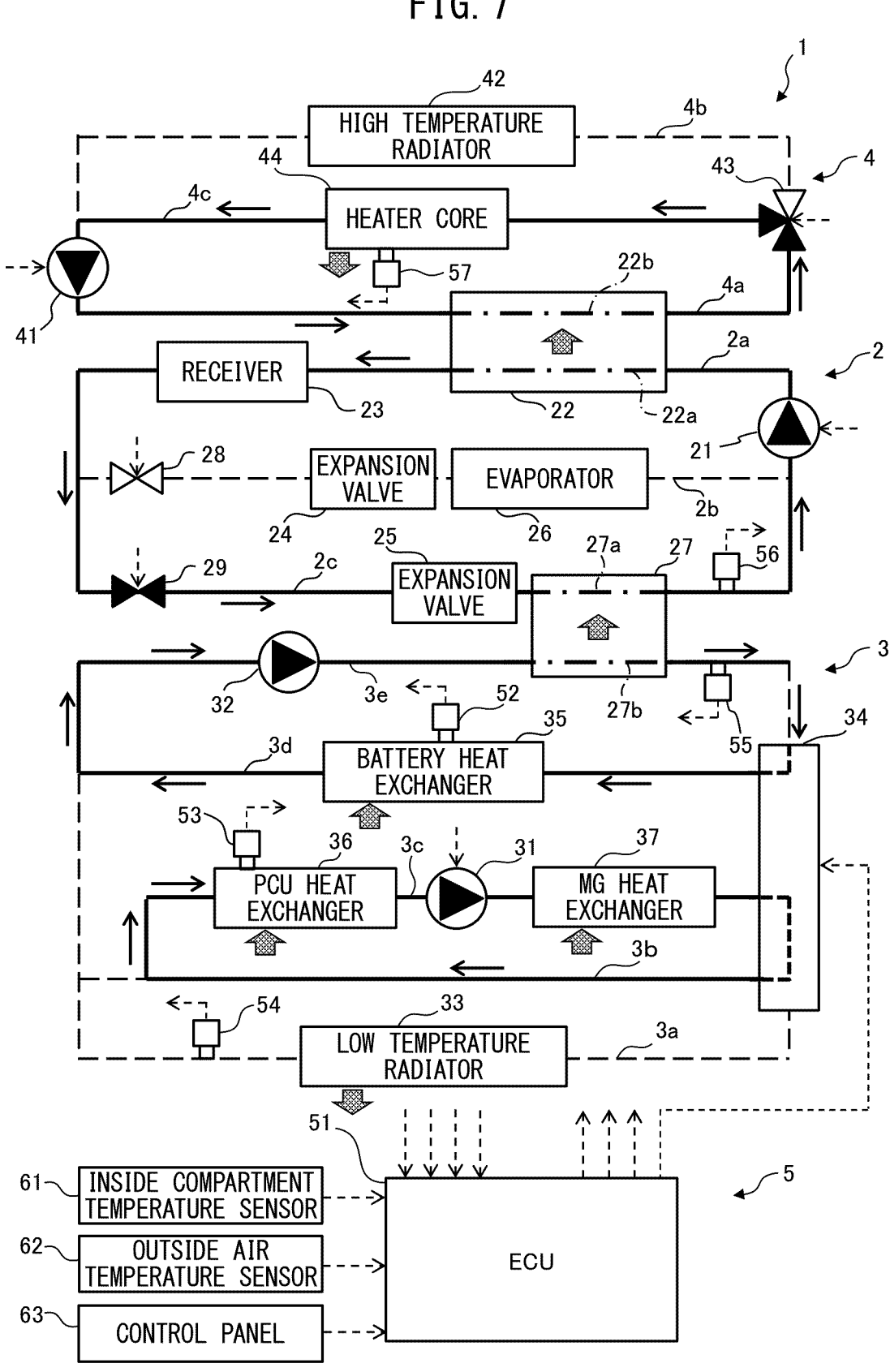
FIG. 7 is a diagram schematically illustrating one flow mode (first heating mode) of the heat medium.

Next, with reference to FIGS. 7 and 8, a flow mode (heating mode) of the heating medium when there is a heating request will be described. FIG. 7 is a diagram schematically illustrating a flow mode (first heating mode) of the heat medium when there are a heating request and a cooling request of the battery 114. Therefore, in the first heating mode, the heating is performed and the PCU 112, the MG 110 and the battery 114 are cooled.

As shown in FIG. 7, in the first heating mode, the first pump 31 and the second pump 32 of the low-temperature circuit 3 are operated. In addition, in the first heating mode, the five-way valve 34 is set to a first state in which circulation flow path 3*b* and the heat generating device flow path 3*c* are connected to each other and the battery flow path 3*d* and the chiller flow path 3*e* are connected to each other. Consequently, in the low-temperature circuit 3, the cooling water circulates through the PCU heat exchanger 36 and the MG heat exchanger 37. In addition, another cooling water in the low-temperature circuit 3 circulates through the battery heat exchanger 35 and the chiller 27.

In addition, in the first heating mode, the compressor 21 of the refrigeration circuit 2 is operated, the first electromagnetic regulation valve 28 is closed, and the second electromagnetic regulation valve 29 is opened. Therefore, in the refrigeration circuit 2, the refrigerant circulates through the chiller 27 and the condenser 22 without passing through the evaporator 26. Further, in the first heating mode, the third pump 41 of the high temperature circuit 4 is operated, and the three-way valve 43 is set so that the cooling water flows through the heater core 44 without passing through the high temperature radiator 42.

Consequently, in the first heating mode, heat is absorbed from the PCU 112 and the MG 110, and the heat is released in the low-temperature circuit 3. In addition, in the first heating mode, heat is absorbed from the battery 114 at the battery heat exchanger 35, and heat is transferred from the cooling water of the low-temperature circuit 3 to the refrigerant of the refrigeration circuit 2 at the chiller 27. Further, in the first heating mode, at the condenser 22, heat is transferred from the refrigerant of the refrigeration circuit 2 to the cooling water of the high-temperature circuit 4, and the heat is released to the surrounding air at the heater core 44. Therefore, in the first heating mode, heat is absorbed from the battery 114 at the battery heat exchanger 35, and the heat is released to the surrounding air flowing through the air passage 6 at the heater core 44, so that the interior of the vehicle 100 is heated. In the present embodiment, at this time, the air mix door 72 is arranged so that all the air flows through the heater core 44.

Figure 8:
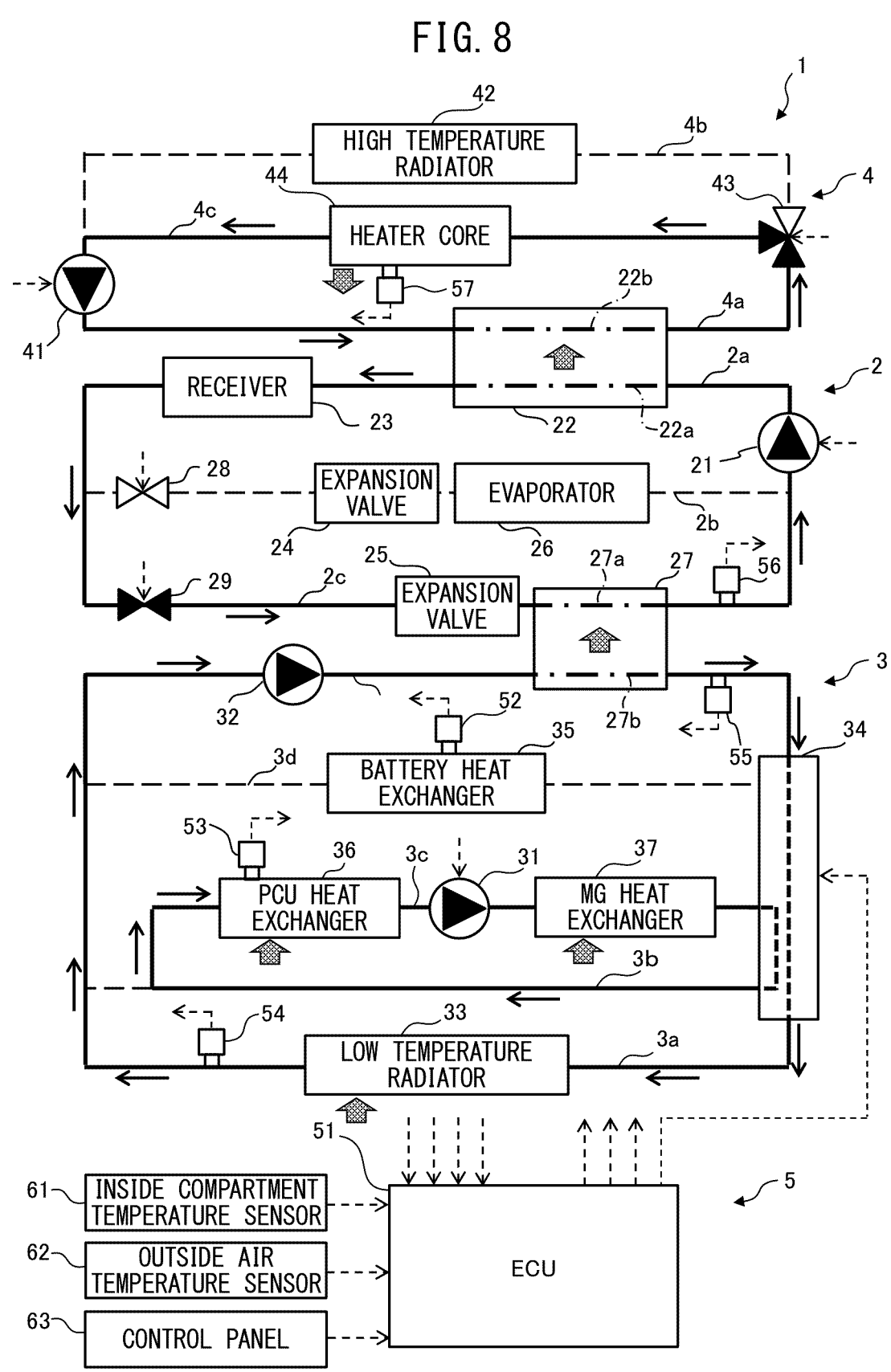
FIG. 8 is a diagram schematically illustrating one flow mode (second heating mode) of the heat medium.

FIG. 8 is a diagram schematically illustrating a flow mode (second heating mode) of the heat medium when there is a heating request and there is no cooling request for the battery 114. Therefore, in the first heating mode, the heating is performed and the PCU 112 and the MG 110 are cooled.

As shown in FIG. 8, the second heating mode differs from the first heating mode only in the connection state of the five-way valve 34 of the low-temperature circuit 3. In the second heating mode, the five-way valve 34 is set to a second state in which the low-temperature radiator flow path 3a and the chiller flow path 3e are connected to each other and the circulation flow path 3b and the heat generating device flow path 3c are connected to each other. Consequently, in the second heating mode, heat is absorbed from the PCU 112 and the MG 110 into the cooling water in the PCU heat exchanger 36 and the MG heat exchanger 37. In addition, in the second heating mode, heat is absorbed from the outside air to the cooling water of the low-temperature circuit 3 in the low-temperature radiator 33, and the heat is transferred from the cooling water to the refrigerant of the refrigeration circuit 2 in the chiller 27, and finally, the heat is discharged to the surrounding air in the heater core 44. Therefore, in the second heating mode, heat is absorbed from the outside air at the low-temperature radiator 33, and the heat is released to the surrounding air flowing through the air passage 6 at the heater core 44, so that the interior of the vehicle 100 is heated. In the present embodiment, at this time, the air mix door 72 is arranged so that all the air flows through the heater core 44.

<Control of Compressor and Expansion Valve>

Figure 9:
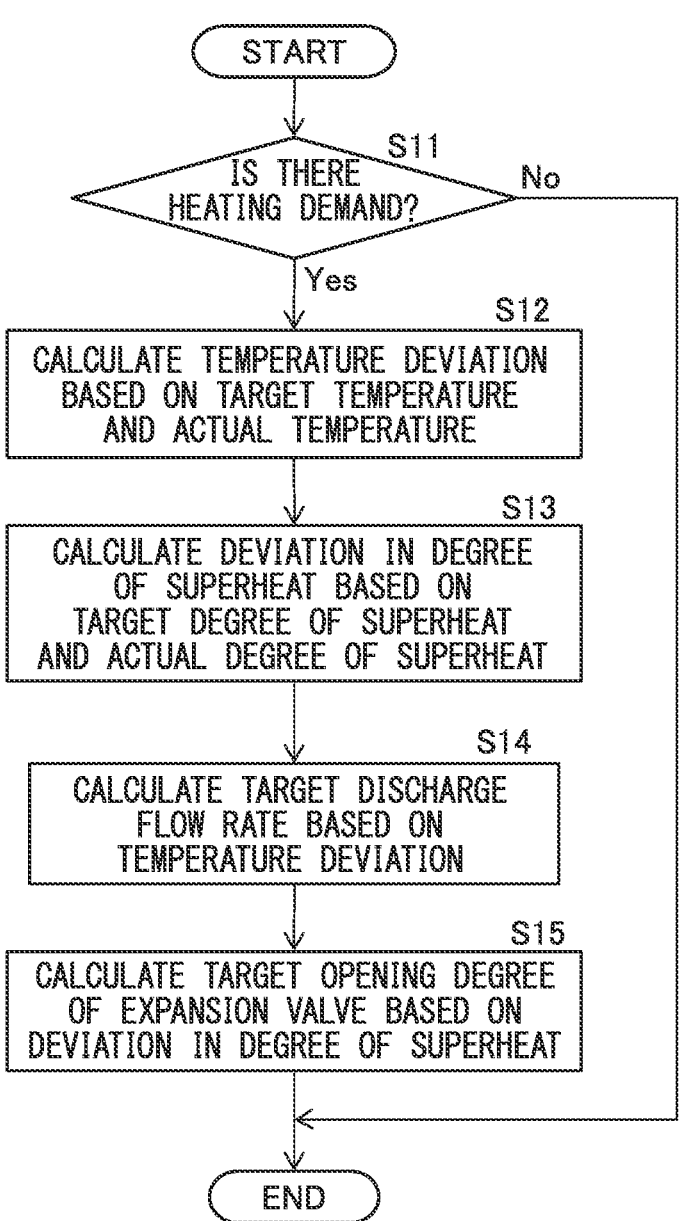
FIG. 9 is a flowchart illustrating a flow of a process for controlling the compressor and a second expansion valve in the heating mode.

Next, with reference to FIG. 9, the control of the compressor 21 and the second expansion valve 25 in the heating mode will be briefly described. In the present embodiment, the target discharge flow rate (target output) of the compressor 21 is feedback-controlled so that a temperature of the air flowing out from the air passage 6 into the interior (hereinafter, also referred to as "blow-off temperature") or a temperature of the cooling water flowing through the heater core 44 (hereinafter, also referred to as "heater temperature") becomes a target temperature. On the other hand, the opening degree of the second expansion valve 25 is feedback-controlled so that a degree of superheat of the refrigerant flowing out from the chiller 27 becomes a target degree of superheat.

FIG. 9 is a flowchart showing a flow of processing for controlling the compressor 21 and the second expansion valve 25 in the heating mode. The flow chart shown in FIG. 9 is executed in the ECU 51 at regular intervals.

As shown in FIG. 9, the ECU 51 first determines whether there is a heating demand (step S11). In the present embodiment, the ECU 51 determines the presence or absence of a heating demand based on the output signals from the indoor temperature sensor 61, the outside air temperature sensor 62, and the operation panel 63. When it is determined that there is no heating demand in the step S11, the process is terminated.

On the other hand, when it is determined that there is a heating demand in the step S11, the ECU 51 calculates a deviation between the target blow-off temperature and the actual blow-off temperature, or a deviation between the target heater temperature and the actual heater temperature (step S12). The target blow-off temperature and the target heater temperature are calculated based on output signals from the indoor temperature sensor 61 and the operation panel 63. The actual blow-off temperature is detected by, for example, the blow-off temperature sensor 58, and the actual heater temperature is detected by, for example, the heater core water temperature sensor 57.

Thereafter, the ECU 51 calculates the deviation between the target degree of superheat and the actual degree of superheat of the refrigerant flowing out from the chiller 27 (step S13). The target degree of superheat may be a constant value, or may be set based on the target blow-off temperature, the target heater temperature, the temperature of the cooling water detected by the chiller water temperature sensor 55, or the like. The actual degree of superheat is calculated based on, for example, the output of the temperature and pressure sensor 56 that detects the temperature and pressure of the refrigerant flowing out from the chiller 27.

Next, the ECU 51 calculates the target discharge flow rate of the compressor 21 so that the deviation becomes zero based on the deviation of the temperature (deviation of the blow-off temperature or deviation of the heater temperature) calculated at the step S12 (step S14). Then, the ECU 51 controls the compressor 21 so that the discharge flow rate of the compressor 21 becomes the calculated target discharge flow rate.

Next, the ECU 51 calculates the target expansion valve opening degree of the second expansion valve 25, based on the deviation of the degree of superheat calculated in the step S14, so that the deviation becomes zero (step S15). Then, the ECU 51 controls the second expansion valve 25 so that the opening degree of the second expansion valve 25 becomes the target expansion valve opening degree.

<Change in Blow-Off Temperature when Switching the Five-Way Valve>

Incidentally, when the discharge flow rate of the compressor 21 and the opening degree of the second expansion valve 25 is feedback-controlled as described above, for example when switching the connection state of the five-way valve 34 during heating, the blow-off temperature into the interior of the vehicle 100 may be greatly changed. In particular, when the connection state of the five-way valve 34 is switched between a state in which the cooling water flowing through the heat exchanger for the heat generating device such as the battery heat exchanger 35 flows into the chiller 27 and a state in which the cooling water flowing through the low-temperature radiator 33 without passing through the heat exchanger for the heat generating device flows into the chiller 27, a change in the blow-off temperature is likely to occur.

Figure 10:
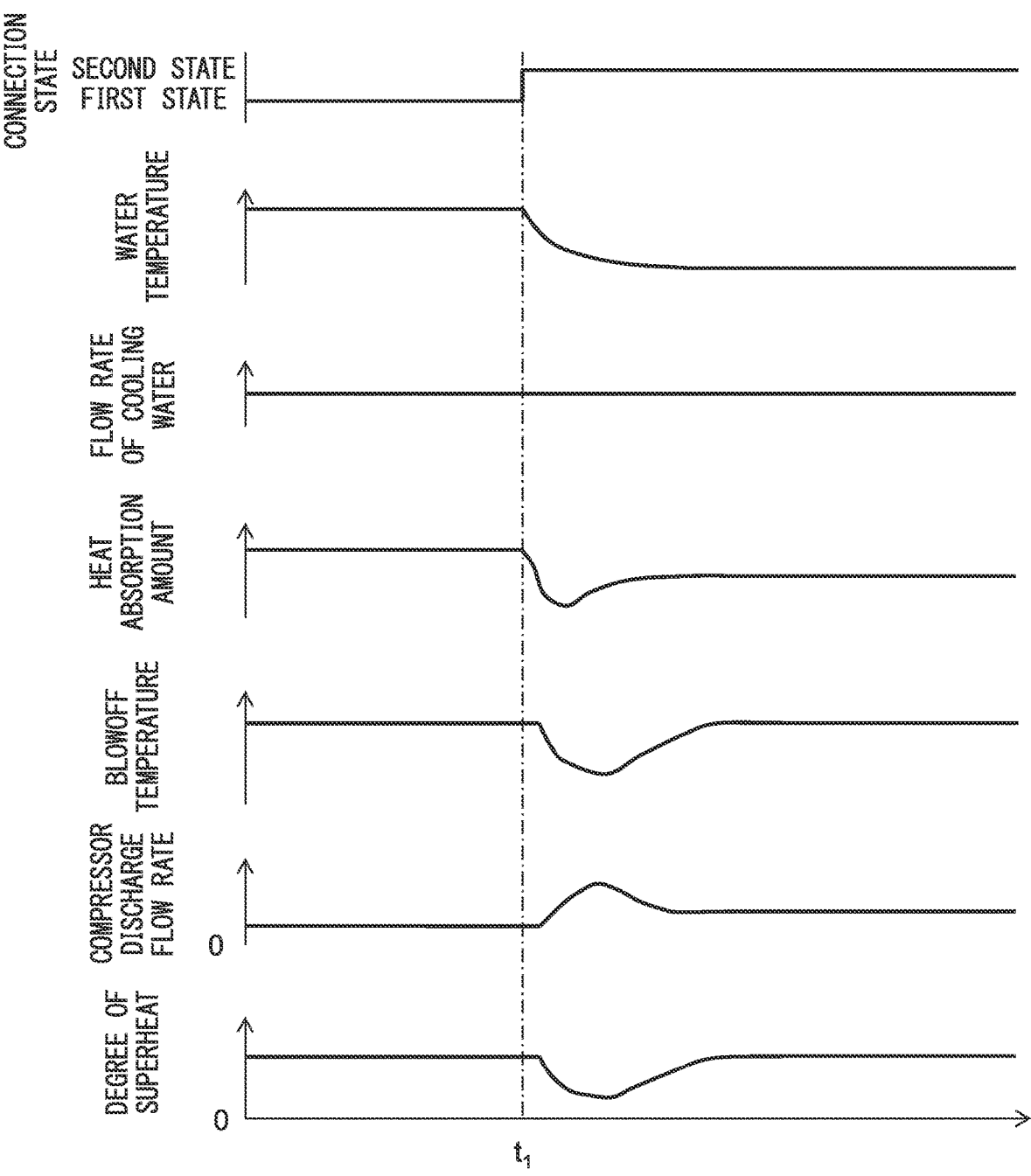
FIG. 10 is a time chart of a connection state of a five-way valve, etc.

This state will be described with reference to FIG. 10. FIG. 10 is a time chart of the connection state of the five-way valve 34, the temperature of the cooling water flowing through the chiller 27, the flow rate of the cooling water flowing through the chiller 27, the amount of heat absorbed from the cooling water to the refrigerant at the chiller 27, the blow-off temperature to the interior of the vehicle 100, the discharge flow rate (output) of the compressor 21, and the degree of superheat of the refrigerant flowing out from the chiller 27. In the embodiment shown in FIG. 10, at the time $t_1$, the operation mode of the in-vehicle temperature control system 1 is switched from the first heating mode to the second heating mode. That is, in the embodiment shown in FIG. 10, the connecting state of the five-way valve 34 is switched from the first state (FIG. 7) to the second state (FIG. 8) at the time $t_1$.

As shown in FIG. 10, when the connection state of the five-way valve 34 is switched from the first state to the second state, the temperature of the cooling water flowing through the chiller 27 decreases. This is because, in the first state, the relatively high-temperature cooling water that has passed through the battery heat exchanger 35 flows into the chiller 27, whereas in the second state, the relatively low-temperature cooling water that has passed through the low-temperature radiator 33 flows into the chiller 27. When the temperature of the cooling water decreases in this way, the heat absorption amount from the cooling water to the refrigerant at the chiller 27 decreases accordingly. As a result, the amount of heat absorbed from the refrigerant to the cooling water at the condenser 22 decreases, the temperature of the cooling water flowing through the heater core 44 decreases, and thus the blow-off temperature into the interior of the vehicle 100 decreases as shown in FIG. 10. As described above, when the blow-off temperature into the interior of the vehicle 100 decreases, the discharge flow rate of the compressor 21 is increased by the feedback control, the temperature of the refrigerant in the condenser 22 is increased, the amount of heat absorbed from the refrigerant to the cooling water in the condenser 22 is increased, and as a result, the blow-off temperature into the interior of the vehicle 100 is increased.

Here, since feedback control is performed based on the blow-off temperature or the heater temperature, the discharge flow rate of the compressor 21 is increased when the blow-off temperature or the heater temperature decreases. For this reason, the discharge flow rate of the compressor 21 is delayed to increase after the temperature of the cooling water flowing through the chiller 27 decreases, and as shown in FIG. 10, the blow-off temperature into the interior of the vehicle 100 temporarily decreases. As a result, the air-conditioning comfort of the occupant of the vehicle 100 may deteriorate.

Further, the temperature of the cooling water flowing through the chiller 27 suddenly decreases, so that the temperature of the refrigerant also suddenly decreases. As a result of the abrupt decrease in the temperature of the refrigerant, a delay occurs in the feedback control of the opening degree of the second expansion valve 25. As a result, as shown in FIG. 10, the degree of superheat of the refrigerant flowing out from the chiller 27 greatly changes from the target degree of superheat. When the degree of superheat of the refrigerant flowing out from the chiller 27 greatly changes from the target degree of superheat, there is a possibility that the liquid-phase refrigerant is mixed into the refrigerant flowing into the compressor 21, which leads to a decrease in durability of the compressor 21.

In addition, in a case where the connection state of the five-way valve 34 is switched from the second state to the first state in contrast to the example shown in FIG. 10, the blow-off temperature into the interior of the vehicle 100 temporarily increases. Therefore, even in such a case, there is a possibility that the air-conditioning comfort of the occupant of the vehicle 100 deteriorates. Further, in this case, the degree of superheat of the refrigerant flowing out from the chiller 27 temporarily increases, and the pressure of the refrigerant flowing into the compressor 21 or the like increases, and as a result, the durability of the refrigeration circuit 2 including the compressor 21 decreases.

<Temperature Control During Heating>

Therefore, in the present embodiment, when the temperature of the cooling water flowing through the chiller 27 changes by a predetermined reference value or more during the heating in the interior of the vehicle 100, the control device 5 controls the discharge flow rate of the second pump 32 in a direction in which the change in the heat absorption amount of the refrigerant at the chiller 27 due to the change in the temperature of the cooling water decreases. In particular, in the present embodiment, when the temperature of the cooling water changes by the reference value or more, the control of the second pump 32 is started before the temperature of the cooling water flowing into the heater core 44 changes in accordance with the change in the temperature.

Specifically, in the present embodiment, when the temperature of the cooling water flowing through the chiller 27 increases by the reference value or more per unit time, the discharge flow rate of the second pump 32 is reduced so that the heat exchange is hardly performed in the chiller 27. Conversely, when the temperature of the cooling water flowing through the chiller 27 decreases by the reference value or more per unit time, the discharge flow rate of the second pump 32 is increased so that the heat exchange is easily performed in the chiller 27.

Figure 11:
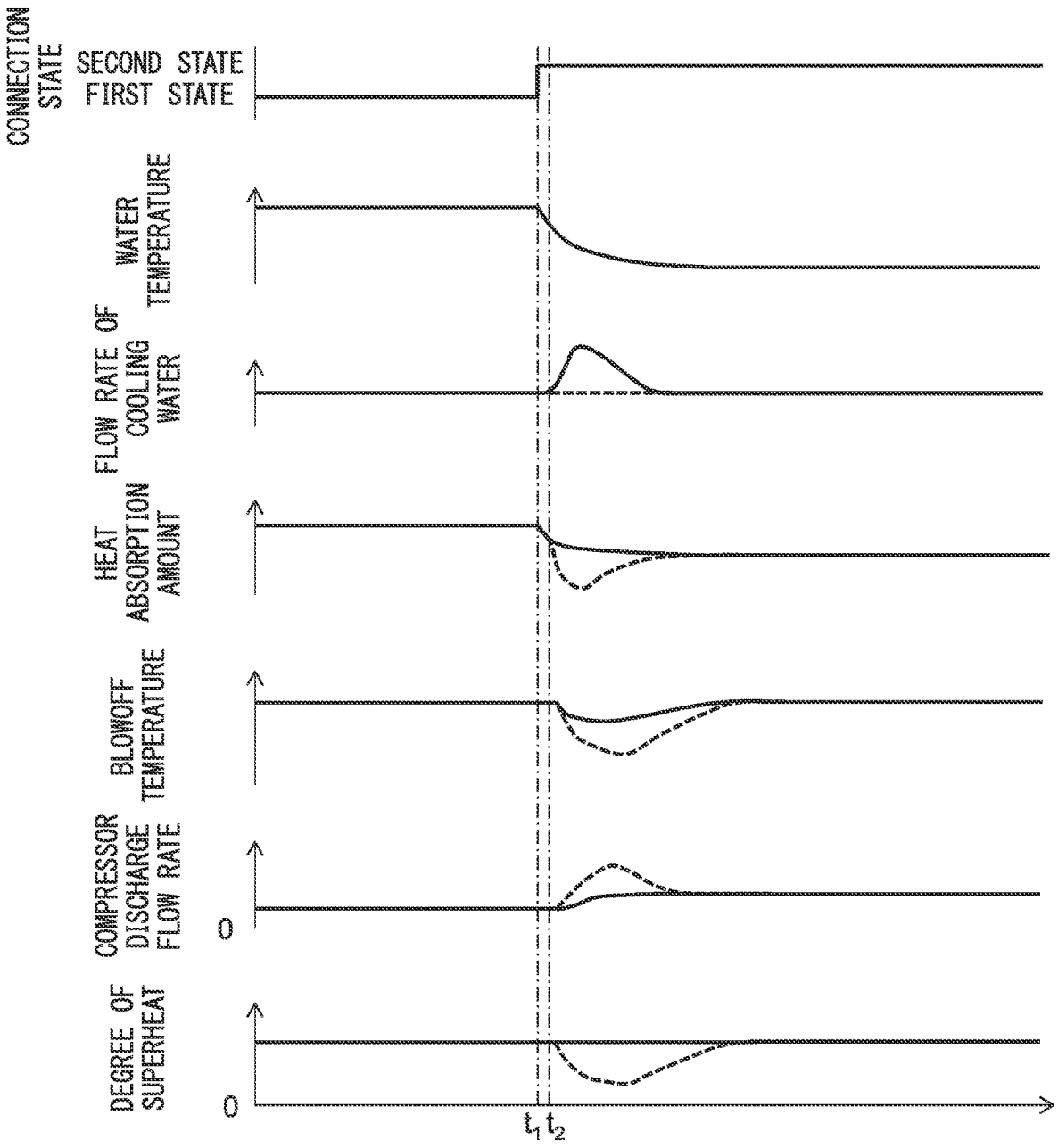
FIG. 11 is a time chart, similar to FIG. 10, of the connection state of a five-way valve, etc.

FIG. 11 is a time chart, similar to FIG. 10, of the connection state of the five-way valve 34, etc. A broken line in the figure indicates a transition of each parameter in a case where the temperature control according to the present embodiment is not performed (similar to FIG. 10). In the embodiment illustrated in FIG. 11, the discharge flow rate of the second pump 32 is controlled in a normal manner before the time $t_1$. Specifically, the discharge flow rate of the second pump 32 is controlled to a predetermined constant value, or is changed based on, for example, the temperature of the battery 114 detected by the battery temperature sensor 64.

As shown in FIG. 11, when the connection state of the five-way valve 34 is switched from the first state (FIG. 7) to the second state (FIG. 8), the temperature of the cooling water flowing through the chiller 27 decreases, and as a result, the amount of heat absorbed from the cooling water to the refrigerant at the chiller 27 decreases.

When the temperature of the cooling water flowing through the chiller 27 decreases and the amount of change in the temperature of the cooling water per unit time becomes equal to or greater than the reference value in the time $t_2$, the second pump 32 is controlled so that the change in the heat absorption amount of the refrigerant at the chiller 27 decreases. Specifically, the second pump 32 is controlled so as to increase the flow rate of the cooling water flowing through the chiller 27. As a result, heat exchange is easily performed at the chiller 27, and a decrease in the heat absorption amount is suppressed. In addition, a decrease in the heat absorption amount in the chiller 27 is suppressed, thereby suppressing a decrease in the temperature of the refrigerant in the refrigeration circuit 2, and consequently, a decrease in the degree of superheat of the refrigerant flowing out from the chiller 27 is suppressed. In addition, since the decrease in the heat absorption amount at the chiller 27 is suppressed, the decrease in the temperature of the cooling water in the high-temperature circuit 4 is suppressed, and consequently, the decrease in the blow-off temperature into the interior of the vehicle 100 is suppressed.

Thereafter, when the amount of change in the temperature of the cooling water flowing through the chiller 27 per unit time becomes equal to or less than the reference value, the control of the second pump 32 that increases the flow rate of the cooling water flowing through the chiller 27 is ended. Therefore, the discharge flow rate of the second pump 32 is controlled normally.

As described above, according to the present embodiment, when the change amount of the temperature of the cooling water flowing through the chiller 27 becomes equal to or larger than the reference value, the second pump 32 is controlled in a direction in which the change in the heat absorption amount of the refrigerant at the chiller 27 becomes smaller. As a result, it is possible to suppress a change in the blow-off temperature into the interior of the vehicle 100, and thus it is possible to suppress deterioration in the air-conditioning comfort of the occupant of the vehicle 100. In addition, it is possible to suppress a change in the degree of superheat of the refrigerant flowing out from the chiller 27, and thus it is possible to suppress a decrease in durability of the refrigeration circuit 2 including the compressor 21.

Figure 12:
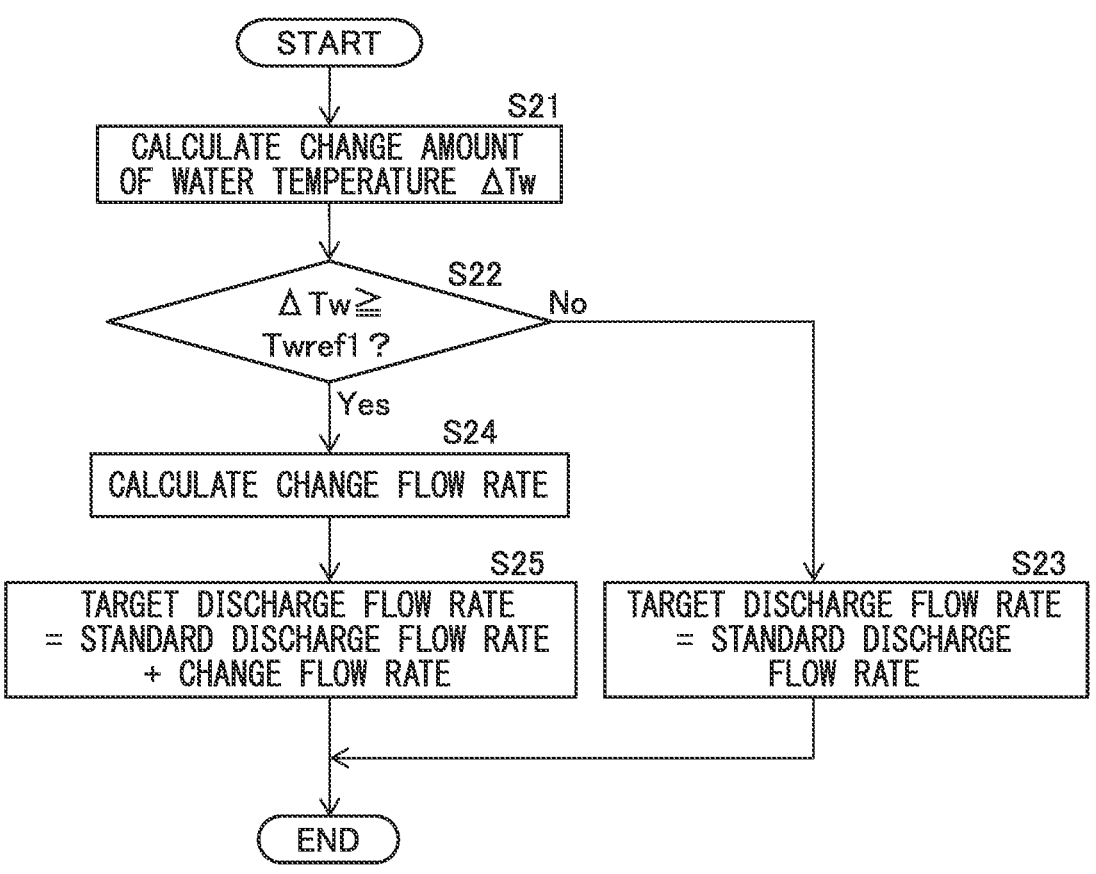
FIG. 12 is a flowchart of a process for controlling a second pump during heating.

FIG. 12 is a flowchart of a process for controlling the second pump 32 during heating. The process illustrated in FIG. 12 is executed by the ECU 51 at regular intervals.

First, the ECU 51 calculates a change amount $\Delta Tw$ of the temperature of the cooling water flowing through the chiller 27 per unit time (step S21). The change amount $\Delta Tw$ is calculated based on the output of the chiller water temperature sensor 55 that detects the temperature of the cooling water flowing through the chiller 27.

Next, the ECU 51 determines whether or not the change amount $\Delta Tw$ of the temperature of the cooling water calculated in the step S21 is equal to or greater than the first reference value Twref1 (step S22). The first reference value Twref1 is, for example, a predetermined constant value. Alternatively, the first reference value Twref1 may be a value that changes based on the temperature of the cooling water of the low-temperature circuit 3 or the like. In any case, the first reference value Twref1 is set to a value such that the change amount $\Delta Tw$ of the temperature of the cooling water is determined to be equal to or greater than the first reference value Twref1 before the temperature of the cooling water flowing into the heater core 44 changes in accordance with the change in the temperature of the cooling water of the low-temperature circuit 3 (that is, before the blow-off temperature changes). If it is determined in step S22 that the change amount $\Delta Tw$ of the temperature of the cooling water is less than the first reference value Twref1, the ECU 51 sets the target discharge flow rate of the second pump 32 to the reference discharge flow rate (step S23). The reference discharge flow rate is a discharge flow rate set at a normal time, and is a predetermined constant value or is set based on a temperature of the battery 114 or the like.

On the other hand, if it is determined in the step S22 that the change amount $\Delta Tw$ of the temperature of the cooling water is equal to or greater than the first reference value Twref1, the ECU 51 calculates a change flow rate which is a discharge flow rate to be changed with respect to the reference discharge flow rate (step S24). The change flow rate is set, for example, in accordance with the change amount $\Delta Tw$ of the temperature of the cooling water calculated in the step S21. When the change amount $\Delta Tw$ of the temperature of the cooling water is a positive value (when the water temperature is increased), the change flow rate is set to a negative value, and when the change amount $\Delta Tw$ of the temperature of the cooling water is a negative value, the change flow rate is set to a positive value. Further, the change flow rate is set so that the absolute value thereof becomes larger as the absolute value of the change amount $\Delta Tw$ of the temperature of the cooling water becomes larger.

Next, the ECU 51 calculates a flow rate obtained by adding the change flow rate calculated in the step S24 to the reference discharge flow rate as the target discharge flow rate (step S25). When the change flow rate is a positive value, the target discharge flow rate is larger than the reference discharge flow rate, and when the change flow rate is a negative value, the target discharge flow rate is smaller than the reference discharge flow rate.

Modification

Next, a modification of the first embodiment will be described with reference to FIGS. 13 and 14. Although in the above first embodiment, the five-way valve 34 is set to the second state in the second heating mode, in the present modification, it is set to the fourth state.

Figure 13:
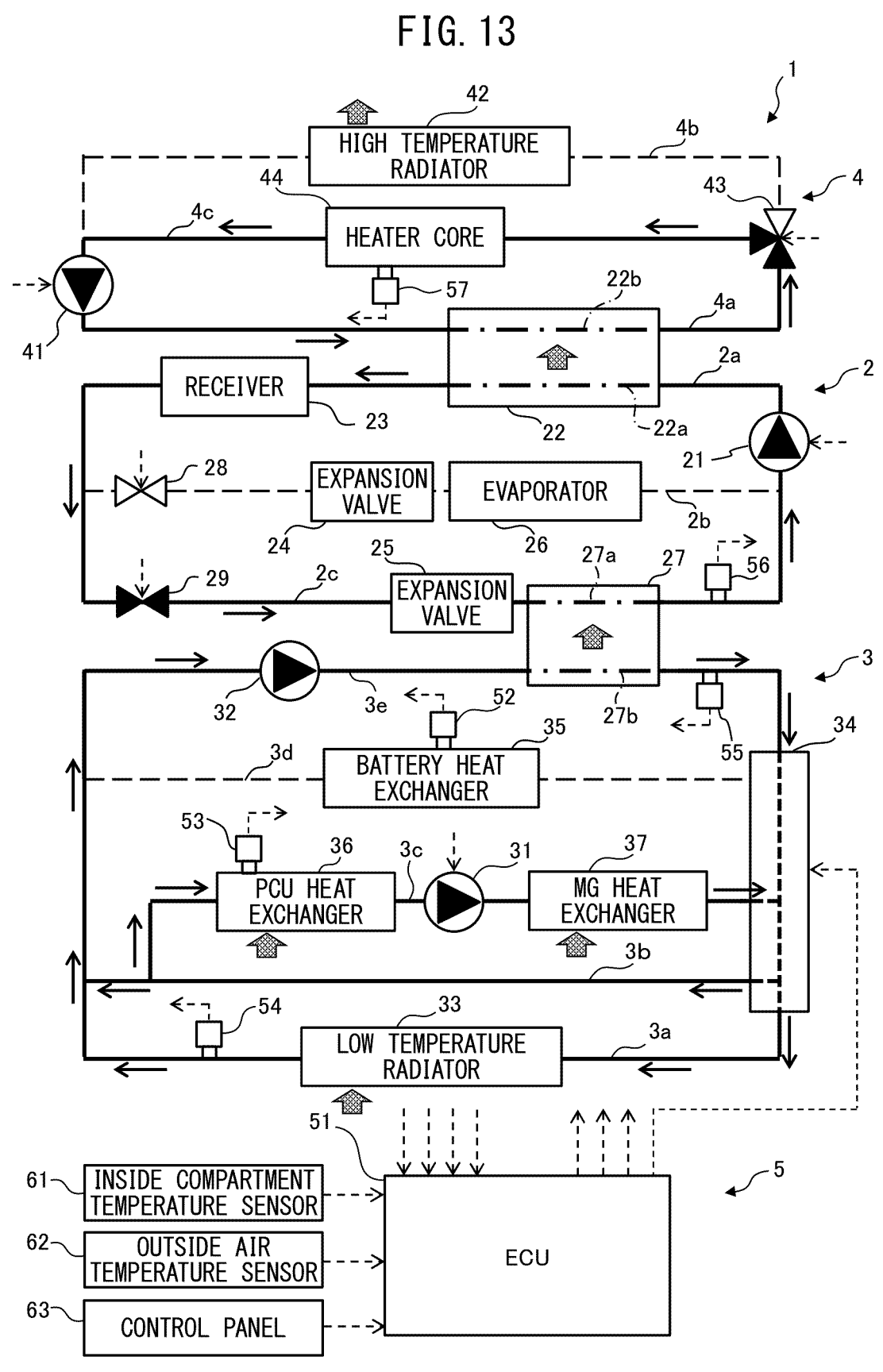

FIG. 13 is a diagram schematically illustrating a flow mode of the heat medium in the second heating mode according to the modification. In the flow mode shown in FIG. 13, the connection state of the five-way valve 34 is different from that of the flow mode shown in FIG. 12. In the second heating mode according to the modification, as shown in FIG. 13, the cooling water flowing out from the five-way valve 34 flows through the low-temperature radiator 33 and the chiller 27 and returns to the five-way valve 34 again. Further, a part of the cooling water flowing out from the five-way valve 34 to the circulation flow path 3b also flows into the chiller 27 and returns to the five-way valve 34. In addition, the rest of the cooling water flowing out from the five-way valve 34 to the circulation flow path 3b returns to the five-way valve 34 through the heating device flow path 3c. Therefore, in the second heating mode according to the modification, the cooling water flowing through the low-temperature radiator 33, the PCU heat exchanger 36, and the MG heat exchanger 37 flows into the chiller 27.

In the present modification, when the temperature of the cooling water flowing through the chiller 27 changes by a predetermined reference value or more, the oil pump of the MG heat exchanger 37 is controlled in addition to the second pump 32 in such a manner that the change in the heat absorption amount of the refrigerant in the chiller 27 due to the change in the cooling water becomes smaller.

Specifically, when the temperature of the cooling water flowing through the chiller 27 increases by the reference value or more per unit time, the discharge flow rate of the oil pump is reduced so that the flow rate of the oil is reduced in order to lower the temperature of the cooling water. On the other hand, when the temperature of the cooling water flowing through the chiller 27 decreases by the reference value or more per unit time, the discharge flow rate of the oil pump is increased so that the flow rate of the oil increases in order to increase the temperature of the cooling water.

Figure 14:
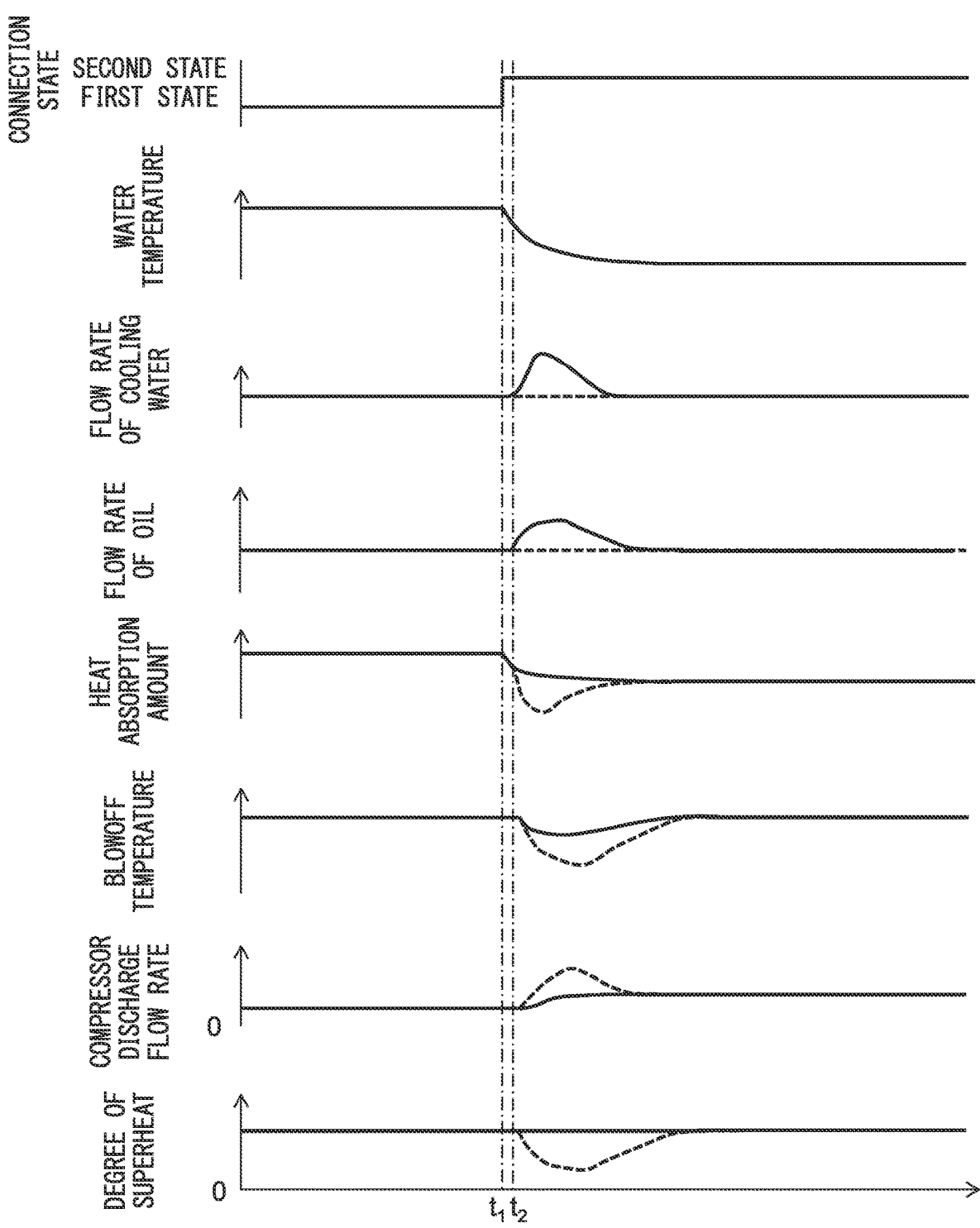
FIG. 14 is a time chart, similar to FIG. 11, of the connection state of a five-way valve, etc.

FIG. 14 is a time chart, similar to FIG. 11, of the connection state of the five-way valve 34, etc. In FIG. 14, the transition of the oil flow rate flowing through the MG heat-exchanger 37 is added to the time chart of FIG. 11. As can be seen from FIG. 14, when the temperature of the cooling water flowing through the chiller 27 decreases and the change amount of the temperature of the cooling water per unit time becomes equal to or greater than the reference value in the time $t_2$, the oil pump is controlled so that the flow rate of the oil increases so as to increase the temperature of the cooling water.

As described above, in the present modification, when the change amount of the temperature of the cooling water flowing through the chiller 27 becomes equal to or larger than the reference value, the discharge flow rate of the oil pump is controlled in a direction in which the change in the heat absorption amount of the refrigerant at the chiller 27 decreases in addition to the flow rate of the cooling water flowing through the chiller 27. As a result, it is possible to further suppress a change in the blow-off temperature into the interior of the vehicle 100, and thus it is possible to further suppress a deterioration in the air-conditioning comfort of the occupant of the vehicle 100. In this modification, the oil pump is controlled in addition to the second pump 32. However, only the oil pump may be controlled without controlling the second pump 32.

SECOND EMBODIMENT

Next, the in-vehicle temperature control system 1 according to the second embodiment will be described with reference to FIGS. 15 and 16. The configuration and control of the in-vehicle temperature control system 1 according to the second embodiment are basically the same as the configuration and control of the in-vehicle temperature control system 1 according to the first embodiment. Hereinafter, a portion different from the in-vehicle temperature control system 1 according to the first embodiment will be mainly described.

In the present embodiment, in the control device 5, when the temperature of the cooling water flowing through the chiller 27 changes by a predetermined reference value or more during the heating in the interior of the vehicle 100, the discharge flow rate of the compressor 21 and the opening degree of the second expansion valve 25 are controlled in a direction in which the change in the heat absorption amount of the refrigerant at the chiller 27 due to the change in the cooling water decreases. Also in the present embodiment, when the temperature of the cooling water changes by the reference value or more, the control of the compressor 21 and the second expansion valve 25 is started before the temperature of the cooling water flowing into the heater core 44 changes in accordance with the change in the temperature.

Specifically, in the present embodiment, when the temperature of the cooling water flowing through the chiller 27 increases by the reference value or more per unit time, the discharge flow rate of the compressor 21 is reduced so that the heat exchange is hardly performed in the chiller 27. In this case, the opening degree of the second expansion valve 25 is increased in order to suppress the heat exchange at the chiller 27 and suppress the increase in the degree of superheat of the refrigerant flowing out of the chiller 27. Conversely, when the temperature of the cooling water flowing through the chiller 27 decreases by the reference value or more per unit time, the discharge flow rate of the compressor 21 is increased so that the chiller 27 can easily exchange heat. In this case, the opening degree of the second expansion valve 25 is reduced in order to promote heat exchange at the chiller 27 and suppress a decrease in the degree of superheat of the refrigerant flowing out from the chiller 27.

Figure 15:
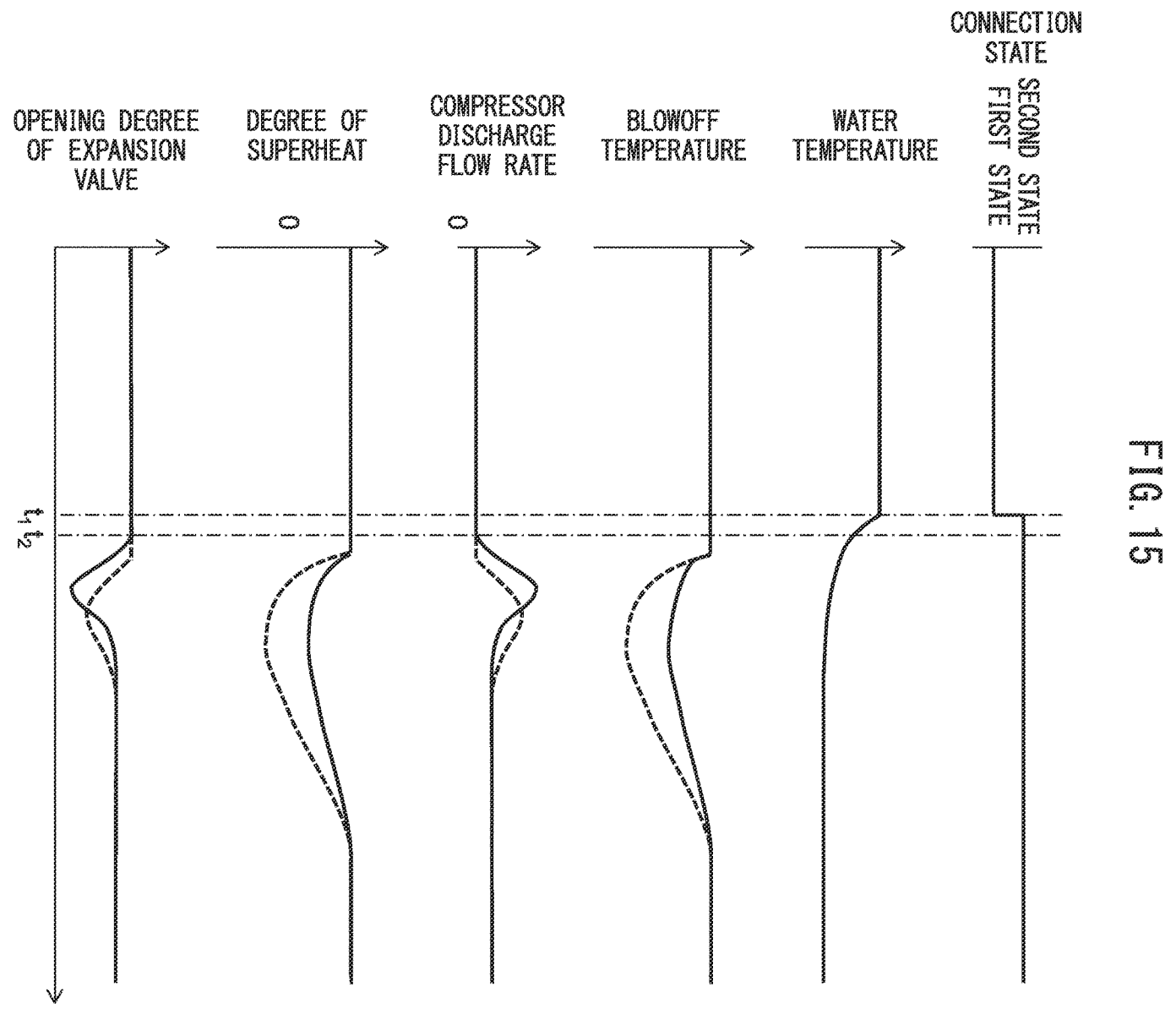

FIG. 15 is a time chart, similar to FIG. 10, of the connection state of the five-way valve 34, etc. A broken line in the figure indicates a transition of each parameter in a case where the temperature control according to the present embodiment is not performed (similar to FIG. 10). In the embodiment shown in FIG. 15, before the time $t_1$, the discharge flow rate of the compressor 21 and the opening degree of the second expansion valve 25 are controlled normally by the process shown in FIG. 9.

As shown in FIG. 15, when the connecting state of the five-way valve 34 is switched from the first state (FIG. 7) to the second state (FIG. 8) at the time $t_1$, the temperature of the cooling water flowing through the chiller 27 decreases, and the change amount of the temperature of the cooling water per unit time becomes equal to or greater than the reference value at the time $t_2$.

In the present embodiment, at the time $t_2$, the compressor 21 and the second expansion valve 25 are controlled in such a manner that the change in the heat absorption amount of the refrigerant at the chiller 27 is reduced. Specifically, the compressor 21 is controlled so as to increase the discharge flow rate, and the second expansion valve 25 is controlled so as to decrease the opening degree. As a result, a decrease in the degree of superheat of the refrigerant flowing out from the chiller 27 is suppressed, and a decrease in the heat absorption amount in the chiller 27 is suppressed. Then, the decrease in the heat absorption amount at the chiller 27 is suppressed, and consequently, the decrease in the blow-off temperature into the interior of the vehicle 100 is suppressed.

Thereafter, when the change amount per unit time of the temperature of the cooling water flowing through the chiller 27 becomes less than the reference value, the control of the compressor 21 to increase the discharge flow rate and the control of the second expansion valve 25 to reduce the opening degree are ended. Therefore, the discharge flow rate of the compressor 21 and the opening degree of the second expansion valve 25 are controlled normally.

As described above, according to the present embodiment, when the change amount of the temperature of the cooling water flowing through the chiller 27 becomes equal to or greater than the reference value, the compressor 21 and the second expansion valve 25 are controlled in a direction in which the change in the heat absorption amount of the refrigerant at the chiller 27 becomes smaller. As a result, it is possible to suppress a change in the blow-off temperature into the interior of the vehicle 100, and thus it is possible to suppress deterioration in the air-conditioning comfort of the occupant of the vehicle 100. In addition, it is possible to suppress a change in the degree of superheat of the refrigerant flowing out from the chiller 27, and thus it is possible to suppress a decrease in durability of the refrigeration circuit 2 including the compressor 21.

Figure 16:
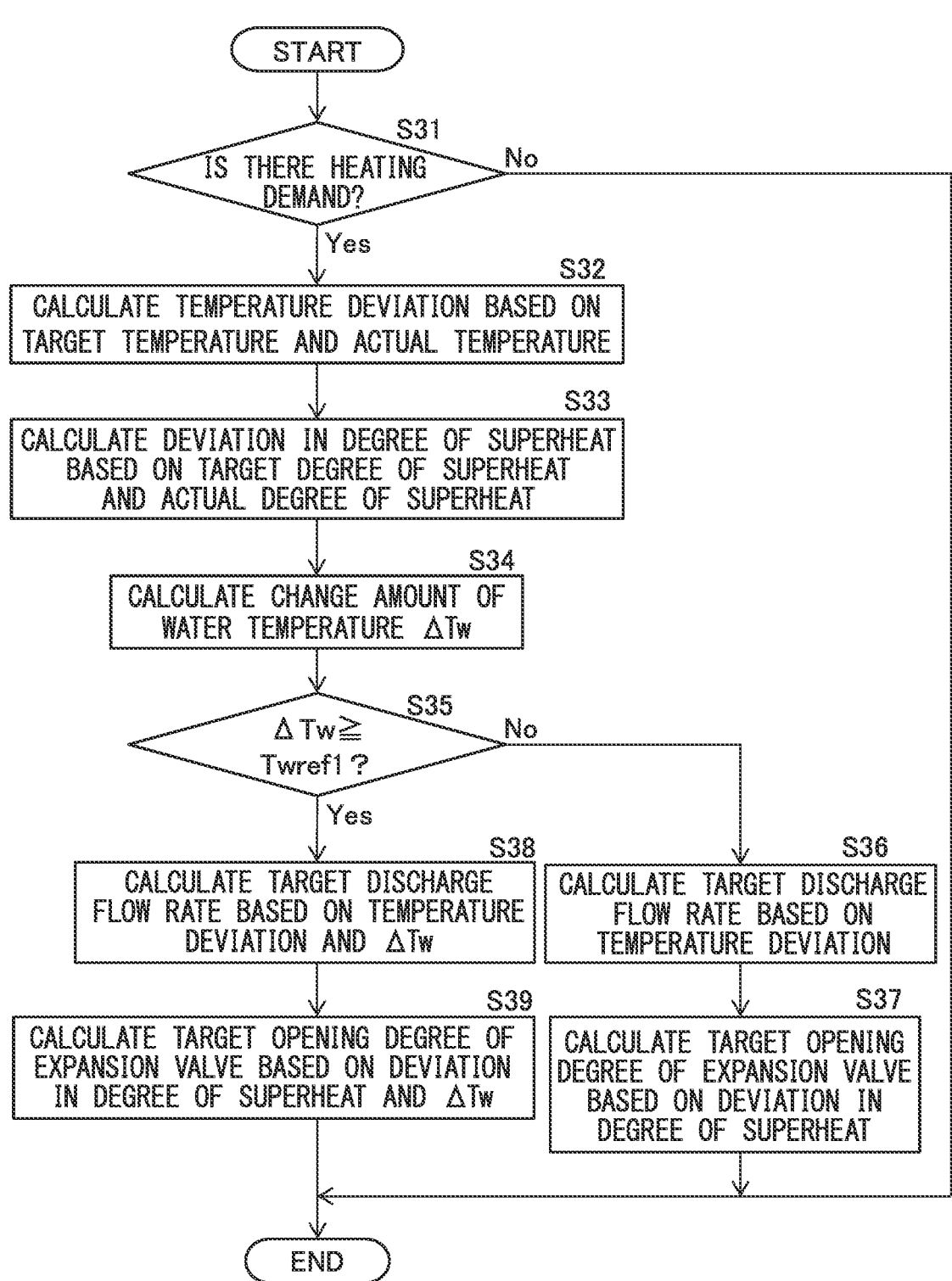
FIG. 16 is a flowchart of a process for controlling the compressor and the second expansion valve during heating.

FIG. 16 is a flowchart of a process for controlling the compressor 21 and the second expansion valve 25 during heating. The process illustrated in FIG. 16 is executed by the ECU 51 at regular intervals. Note that the step S31-S33, S36 and S37 in FIG. 16 are the same as the step S11-S15 in FIG. 9, and the step S34 and S35 in FIG. 16 are the same as the step S21 and S22 in FIG. 12, and thus detailed explanation thereof is omitted.

When it is determined in step S35 that the change amount $\Delta$Tw of the temperature of the cooling water is less than the first reference value Twref1, the ECU 51 calculates the target discharge flow rate of the compressor 21 based on the deviation of the temperature (step S36). In addition, the ECU 51 calculates the target expansion valve opening degree of the second expansion valve 25 based on the deviation of the degree of superheat (step S37).

On the other hand, when it is determined in the step S35 that the change amount $\Delta$Tw of the temperature of the cooling water is equal to or greater than the first reference value Twref1, the ECU 51 calculates the target discharge flow rate of the compressor 21 based on the deviation of the temperature and the change amount $\Delta$Tw of the temperature of the cooling water calculated in the step S34 (step S38). Specifically, the ECU 51 first calculates the change flow rate based on the change amount $\Delta$Tw of the cooling water.

When the change amount ΔTw of the temperature of the cooling water is a positive value (when the water temperature is increased), the change flow rate is set to a negative value, and when the change amount ΔTw of the water temperature is a negative value, the change flow rate is set to a positive value. Then, the ECU 51 calculates the target discharge flow rate by adding the change flow rate to the discharge flow rate calculated based on the deviation of the temperature in the same manner as in step S36.

In addition, the ECU 51 calculates the target expansion valve opening degree of the second expansion valve 25 based on the deviation of the degree of superheat and the change amount ΔTw of the temperature of the cooling water (step S39). Specifically, the ECU 51 first calculates the change opening degree based on the change amount ΔTw of the temperature of the cooling water. When the change amount ΔTw of the temperature of the cooling water is a positive value (when the water temperature is increased), the change opening degree is set to a positive value, and when the change amount ΔTw of the water temperature is a negative value, the change opening degree is set to a negative value. Then, the ECU 51 calculates the target expansion valve opening degree by adding the change opening degree to the expansion valve opening degree calculated based on the deviation of the degree of superheat in the same manner as step S37.

THIRD EMBODIMENT

Next, an in-vehicle temperature control system 1 according to the third embodiment will be described with reference to FIGS. 17 and 18. The configuration and control of the in-vehicle temperature control system 1 according to the third embodiment are basically the same as the configuration and control of the in-vehicle temperature control system 1 according to the first embodiment or the second embodiment. Hereinafter, portions different from the in-vehicle temperature control system 1 according to the first embodiment or the second embodiment will be mainly described.

In the first embodiment and the second embodiment, when the temperature of the cooling water flowing through the chiller 27 changes by the reference value or more during the heating in the interior of the vehicle 100, the ECU 51 controls the heat absorption amount changing device in such a manner that the change in the heat absorption amount of the refrigerant at the chiller 27 decreases. In the present embodiment, the ECU 51 controls the heat absorption amount changing device in the above-described direction when it is predicted that the temperature of the cooling water flowing through the chiller 27 changes by the first reference value or more.

In particular, in the present embodiment, in the case where it is predicted that the temperature of the cooling water flowing through the chiller 27 changes by the first reference value or more, when the temperature of the cooling water flowing through the chiller 27 changes by the second reference value or more smaller than the first reference value after such prediction is made, the heat absorption amount change device is controlled in the above-described direction.

Further, in the present embodiment, the ECU 51 predicts whether or not the temperature of the cooling water changes by the first reference value or more when the five-way valve 34 is switched based on the temperature of the cooling water detected by the battery water temperature sensor 52, the PCU water temperature sensor 53, the radiator water temperature sensor 54, and the chiller water temperature sensor 55. More specifically, the ECU 51 predicts the change amount of the temperature of the cooling water flowing through the chiller 27 when the five-way valve 34 is switched, that is, when the flow path in the low-temperature circuit 3 is switched, based on the temperature detected by these sensors. Then, when the temperature of the cooling water flowing through the chiller 27 changes by the second reference value or more while the amount of change of the temperature predicted in this way is equal to or more than the first reference value, the ECU 51 predicts that the temperature of the cooling water changes by the first reference value or more.

In particular, in the present embodiment, the temperature of the cooling water when the five-way valve 34 is switched is predicted, based on the temperature of the cooling water flowing through the flow path in which the cooling water does not circulate before the five-way valve 34 is switched and the cooling water circulates after the five-way valve is switched and the temperature of the cooling water flowing through the chiller 27. For example, in a case where the five-way valve 34 is switched from the first state to the second state, before the switching of the five-way valve 34, the change amount of the temperature of the cooling water when the five-way valve 34 is switched is predicted, based on the temperature of the cooling water flowing through the low-temperature radiator flow path 3a in which the cooling water is not circulated before the switching and the cooling water is circulated after the switching, and the temperature of the cooling water flowing through the chiller 27. Specifically, the amount of change in the temperature of the cooling water when the five-way valve 34 is switched based on the temperature of the cooling water detected by the radiator water temperature sensor 54 and the chiller water temperature sensor 55 before the five-way valve 34 is switched is predicted. In particular, the predicted value of the change amount of the temperature of the cooling water when the five-way valve 34 is switched is set to a value smaller than the difference between the temperature of the cooling water detected by the radiator water temperature sensor 54 and the temperature of the cooling water detected by the chiller water temperature sensor 55 before the five-way valve 34 is switched.

Figure 17:
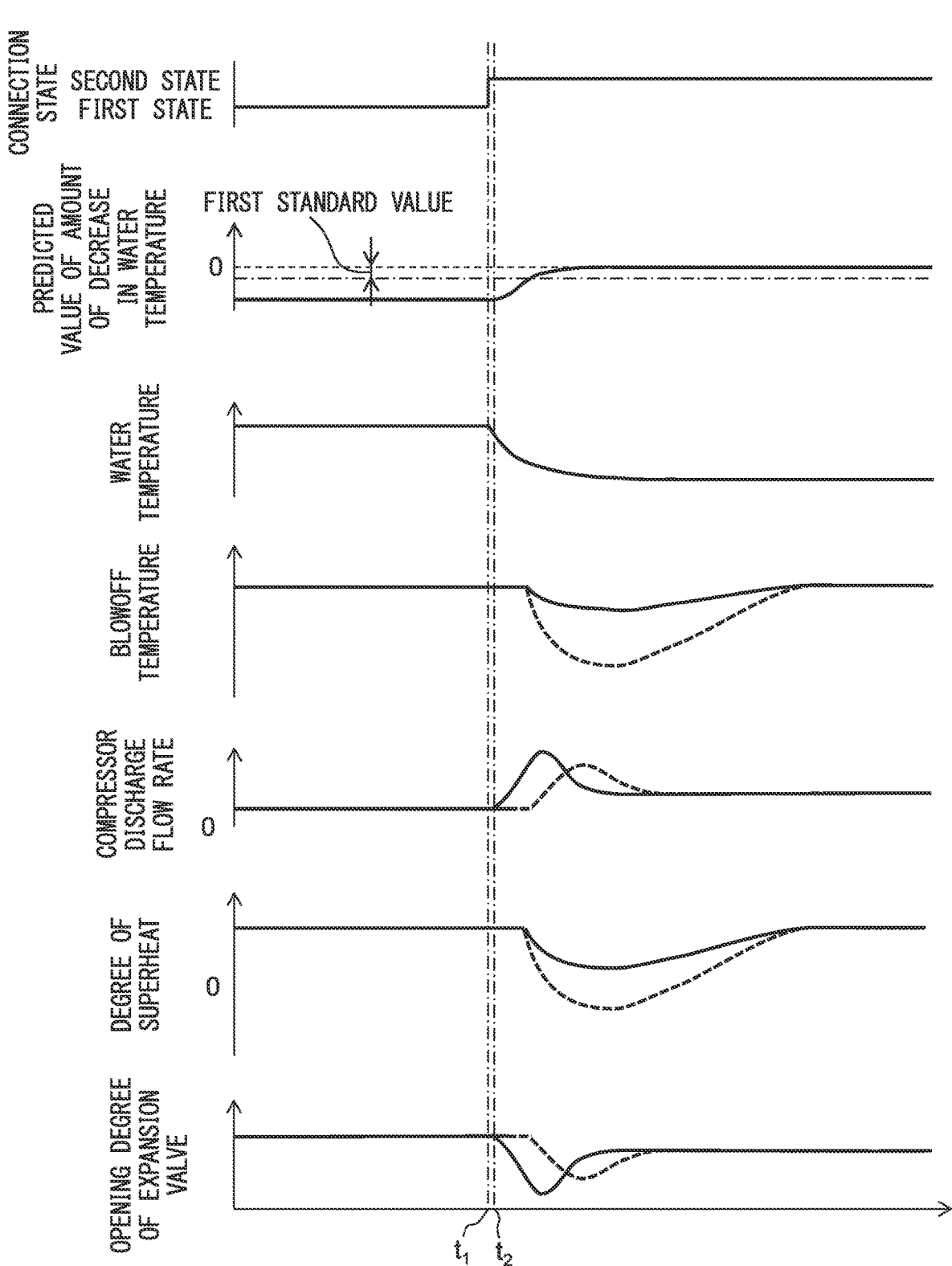
FIG. 17 is a time chart, similar to FIG. 10, of the connection state of a five-way valve, etc.

FIG. 17 is a time chart, similar to FIG. 10, of a connection state of the five-way valve 34, etc. A broken line in the figure indicates a transition of each parameter in a case where temperature control according to the present embodiment is not performed (similar to FIG. 10). Further, the predicted value of the water temperature change amount in the figure represents a predicted value of the change amount of the temperature of the cooling water when the connection state of the five-way valve 34 is switched. In the embodiment shown in FIG. 17, before the time t₁, the discharge flow rate of the compressor 21 and the opening degree of the second expansion valve 25 are controlled normally by the process shown in FIG. 9.

In the embodiment shown in FIG. 17, at the time t₁, the connecting state of the five-way valve 34 is switched from the first state (FIG. 7) to the second state (FIG. 8). Then, at this time t₁, the predicted value of the change amount in the temperature of the cooling water is equal to or more than the first reference value.

When the connecting state of the five-way valve 34 is switched from the first state to the second state at the time t₁, the temperature of the cooling water flowing through the chiller 27 decreases, and in a state where it is expected that the temperature of the cooling water flowing through the chiller 27 changes by the first reference value or more, the change amount of the temperature of the cooling water per unit time becomes the second reference value or more at the time $t_2$. The second reference value is a value smaller than the first reference value. In the present embodiment, at this time $t_2$, the ECU 51 expects that the temperature of the cooling water flowing through the chiller 27 changes by the first reference value or more. Therefore, the ECU 51 controls the compressor 21 and the second expansion valve 25 in such a manner that the change in the heat absorption amount by the refrigerant in the chiller 27 becomes smaller in the time $t_2$.

Thereafter, when the change amount per unit time of the temperature of the cooling water flowing through the chiller 27 becomes less than the second reference value, or when the predicted value of the change amount of the temperature of the cooling water flowing through the chiller 27 is expected to be less than the first reference value, the control of the compressor 21 to increase the discharge flow rate and the control of the second expansion valve 25 to reduce the opening degree is ended. Therefore, the discharge flow rate of the compressor 21 and the opening degree of the second expansion valve 25 are controlled normally.

As described above, according to the present embodiment, when it is expected that the temperature of the cooling water flowing through the chiller 27 changes by the first reference value or more, the compressor 21 and the second expansion valve 25 are controlled in a direction in which the change in the heat absorption amount of the refrigerant at the chiller 27 decreases. As a result, it is possible to suppress a change in the blow-off temperature into the interior of the vehicle 100, and thus it is possible to suppress deterioration in the air-conditioning comfort of the occupant of the vehicle 100. In addition, it is possible to suppress a change in the degree of superheat of the refrigerant flowing out from the chiller 27, and thus it is possible to suppress a decrease in durability of the refrigeration circuit 2 including the compressor 21.

In the above embodiment, when the change amount per unit time of the temperature of the cooling water flowing through the chiller 27 becomes equal to or more than the second reference value in a state in which it is expected that the temperature of that cooling water changes by the first reference value or more if the connection state of the five-way valve 34 is switched, the compressor 21 and the second expansion valve 25 are controlled in a direction in which the change in the heat absorption amount of the refrigerant decreases. However, the ECU 51 may predict that the temperature of the cooling water flowing through the chiller 27 changes by the first reference value or more, when the connection state of the five-way valve 34 is switched in a state where it is expected that if the connection state of the five-way valve 34 is switched, the temperature of the cooling water flowing through the chiller 27 is changed by the first reference value or more. In addition, the oil pump of the second pump 32 or the MG heat-exchanger 37 may be controlled instead of the compressor 21 and the second expansion valve 25. Further, in the above embodiment, the predicted value is calculated based on the output of the sensor that detects the temperature of the cooling water in the low-temperature circuit 3, but the predicted value may be calculated based on other parameters.

Figure 18:
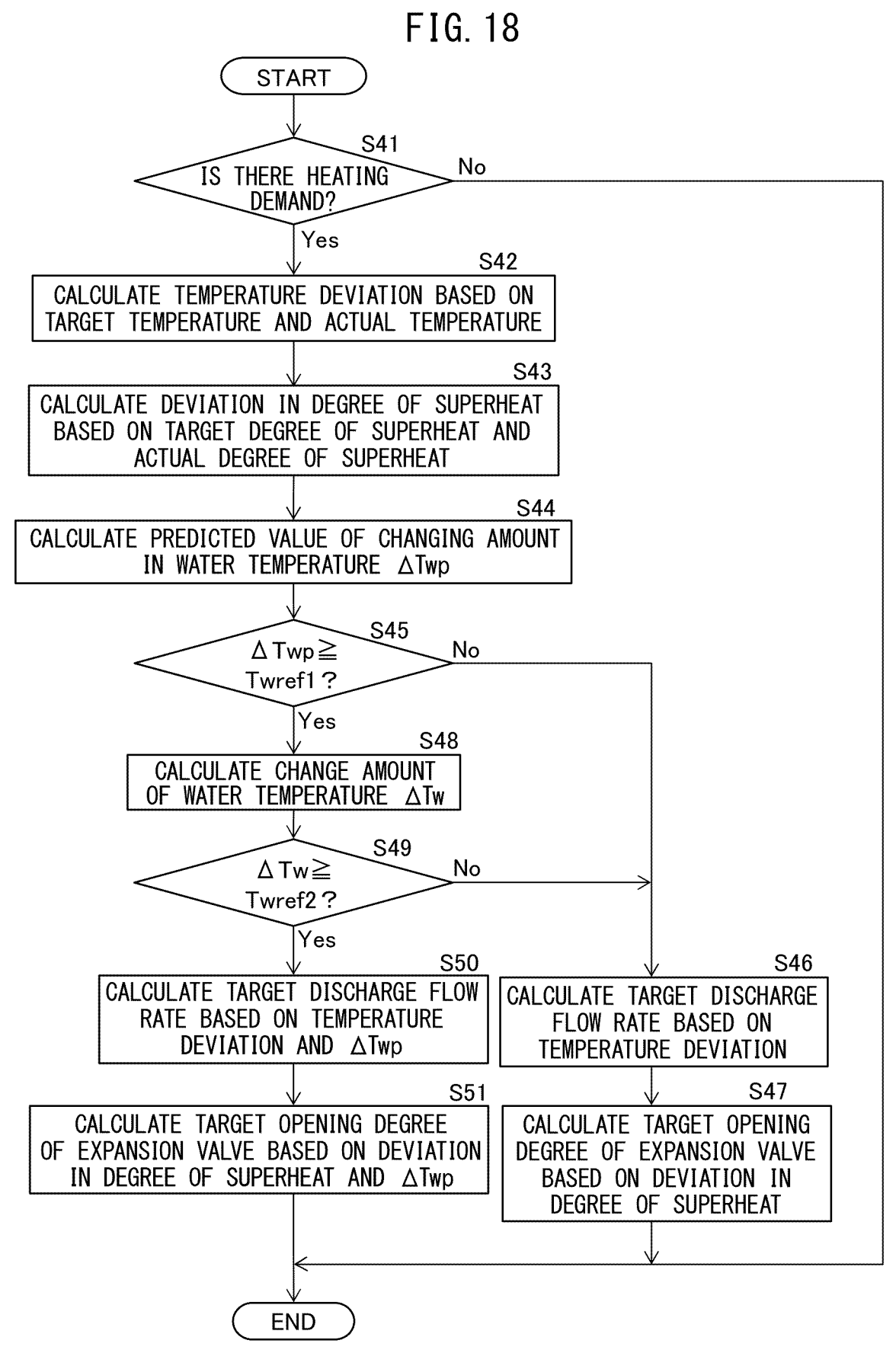

FIG. 18 is a flowchart of a process for controlling the compressor 21 and the second expansion valve 25 during heating. The process illustrated in FIG. 18 is executed by the ECU 51 at regular intervals. Note that the step S41-S43, S46-S47 and S49-S51 in FIG. 18 are the same as the step S31-S33, S36-S37, S34-S35 and S38-S39 in FIG. 16, and thus detailed explanation thereof is omitted.

When the deviation of the temperature and the deviation of the degree of superheat are calculated in the steps S42 and S43, the ECU 51 calculates a predicted value ΔTwp of the change amount in the temperature of the cooling water flowing through the chiller 27 when the connecting state of the five-way valve 34 is switched (step S44). The ECU 51 calculates the predicted value ΔTwp based on the temperature of the cooling water detected by the battery water temperature sensor 52, the PCU water temperature sensor 53, the radiator water temperature sensor 54, the chiller water temperature sensor 55, and the like.

Next, the ECU 51 determines whether or not the predicted value ΔTwp calculated in the step S44 is equal to or greater than the first reference value Twref1 (step S45). If it is determined in step S45 that the predicted value ΔTwp is less than the first reference value Twref1, the ECU 51 calculates the target discharge flow rate of the compressor 21 and the target expansion valve opening degree of the second expansion valve 25 based on the deviation of the temperature and the deviation of the degree of superheat (steps S46, S47).

On the other hand, if it is determined in step S45 that the predicted value ΔTwp is equal to or greater than the first reference value Twref1, the ECU 51 calculates the change amount ΔTw of the temperature of the cooling water (step S48), and determines whether or not the calculated change amount ΔTw of the temperature of the cooling water is equal to or greater than the second reference value Twref2 smaller than the first reference value Twref1 (step S49). If it is determined in step S49 that the change amount ΔTw of the temperature of the water to be discharged is less than the second reference value Twref2, the ECU 51 calculates the target discharge flow rate of the compressor 21 and the target expansion valve opening degree of the second expansion valve 25 based on the deviation of the temperature and the deviation of the degree of superheat (step S46, S47). On the other hand, if it is determined in step S49 that the change amount ΔTw of the temperature of the cooling water is equal to or greater than the second reference value Twref2, the ECU 51 calculates the target discharge flow rate of the compressor 21 based on the deviation of the temperature and the predicted value ΔTwp (step S50), and calculates the target expansion valve opening degree of the second expansion valve 25 based on the deviation of the degree of superheat and the predicted value ΔTwp (step S51).

While preferred embodiments of the present invention have been described above, the present invention is not limited to these embodiments, and various modifications and changes can be made within the scope of the claims.

For example, the configuration of the in-vehicle temperature control system 1 illustrated in FIGS. 2 and 3 is an example, and the in-vehicle temperature control system may have a different configuration. Specifically, for example, the high-temperature circuit 4 may not be provided, and the condenser 22 may be provided in the air passage 6 instead of the heater core 44.

Further, in the above embodiment, the case where the temperature of the cooling water flowing through the chiller 27 is changed by changing the connection state of the five-way valve 34 is described as an example. However, even when the connection state of the five-way valve 34 is not necessarily changed, as long as the temperature of the chiller 27 greatly changes (for example, when the amount of heat generated in the battery 114 abruptly changes), the control according to the above-described embodiment can be applied.

The invention claimed is:

1. An in-vehicle temperature control system which is provided with a vehicle, comprising:

a refrigeration circuit having: a first heat exchanger for absorbing heat from a first heat medium to a refrigerant to evaporate the refrigerant; and a second heat exchanger for releasing heat from the refrigerant to an outside to condense the refrigerant and being able to use the released heat for heating an interior of the vehicle, wherein the refrigeration circuit is configured to realize a refrigeration cycle by circulating the refrigerant through them;

a first thermal circuit having: the first heat exchanger; and an external heat exchanger for absorbing heat from an outside to the first heat medium, wherein the first thermal circuit is configured to circulate the first heat medium through them; and a controller capable of changing a heat absorption amount of the refrigerant at the first heat exchanger and for controlling a device associated with the refrigeration circuit or the first thermal circuit, wherein the controller is configured to control the device in a direction where a change in the heat absorption amount of the refrigerant at the first heat exchanger in accordance with a change in a temperature of the first heat medium is reduced, if the temperature of the first heat medium flowing through the first heat exchanger changes by a reference value or more, or if the temperature of the first heat medium flowing through the first heat exchanger is predicted to change by a reference value or more, during heating of the interior of the vehicle.

2. The in-vehicle temperature control system according to claim 1, further comprising a temperature detector for detecting the temperature of the first heat medium flowing through the first heat exchanger, wherein the controller is configured to control the device in a direction where a change in the heat absorption amount of the refrigerant at the first heat exchanger in accordance with a change in a temperature of the first heat medium is reduced, if a temperature detected by the temperature detector during heating of the interior of the vehicle changes by a reference value or more per unit time.

3. The in-vehicle temperature control system according to claim 1, wherein the first thermal circuit has a plurality of parallel flow paths through which the first heat medium flows, the in-vehicle temperature control system further comprises: a first temperature detector for detecting the temperature of the first heat medium flowing through the first heat exchanger; and a second temperature detector for detecting the temperature of the first heat medium in a flow path through which the first heat medium does not flow before switching the flow path and flows after switching the flow path, among the first thermal circuit, and the controller is configured to predict whether the temperature of the first heat medium flowing through the first heat exchanger changes by a reference value or more by switching the flow path, based on the temperature detected by the first temperature detector and the temperature detected by the second temperature detector.

4. The in-vehicle temperature control system according to claim 1, wherein the controller is configured to control the device in a direction where a change in the heat absorption amount of the refrigerant at the first heat exchanger in accordance with a change in the temperature of the first heat medium decreases, in the case where it is predicted that the temperature of the first heat medium flowing through the first heat exchanger changes by a reference value or more during heating in the interior of the vehicle, when the temperature of the first heat medium flowing through the first heat exchanger changes by a second reference value, which is smaller than the reference value, or more, after the prediction.

5. The in-vehicle temperature control system according to claim 1, further comprising a second thermal circuit having the second heat exchanger and a heater core used for heating the interior of the vehicle and configured to circulate a second heat medium therethrough, wherein the second heat exchanger dissipates heat from the refrigerant to the second heat medium.

6. The in-vehicle temperature control system according to claim 5, wherein the controller is configured to start to control the device in the case where the temperature of the first heat medium flowing into the first heat exchanger changes by a reference value or more or it is predicted that the temperature of the first heat exchanger flowing into the first heat exchanger changes by a reference value or more, before the temperature of the second heat medium flowing into the heater core changes in accordance with the change in the temperature of the first heat medium, during heating of the interior of the vehicle.

7. The in-vehicle temperature control system according to claim 5, wherein the second heat exchanger is not provided with an electric heater that heats the second heat medium flowing into the heater core.

8. The in-vehicle temperature control system according to claim 1, wherein the device is a device capable of changing a value of a parameter including at least one of a flow rate of the refrigerant in the refrigeration circuit, a flow rate of the first heat medium in the first thermal circuit, a degree of superheat of the refrigerant flowing into the first heat exchanger, and a heat absorption amount in the external heat exchanger.

9. The in-vehicle temperature control system according to claim 8, wherein the device includes a compressor provided in the refrigeration circuit and compressing the refrigerant, and the controller is configured to control a discharge flow rate of the compressor to control a flow rate of refrigerant in the refrigeration circuit.

10. The in-vehicle temperature control system according to claim 8, wherein the device includes a pump provided in the first thermal circuit and pumping the first heat medium, and the controller is configured to control a discharge flow rate of the pump to control the flow rate of the first heat medium in the first thermal circuit.

11. The in-vehicle temperature control system according to claim 8, wherein the device includes an expansion valve provided in the refrigeration circuit and reducing the pressure of the refrigerant, and the controller is configured to control an opening degree of the expansion valve to control a degree of superheat of the refrigerant flowing into the first heat exchanger.

12. The in-vehicle temperature control system according to claim 8, wherein the external heat exchanger is configured to exchange heat between an external heat source and the first heat medium of the first thermal circuit via a third heat medium, and the controller is configured to control a flow rate of the third heat medium in the external heat exchanger to control the heat absorption amount at the external heat exchanger.

13. The in-vehicle temperature control system according to claim 12, wherein the external heat source is an electric motor that drives the vehicle.

* * * * *